US011560828B2

(12) United States Patent
Kimoto et al.

(10) Patent No.: US 11,560,828 B2
(45) Date of Patent: Jan. 24, 2023

(54) ENGINE

(71) Applicant: SUBARU CORPORATION, Tokyo (JP)

(72) Inventors: Kenta Kimoto, Tokyo (JP); Masaaki Kato, Tokyo (JP); Satoru Yamaguchi, Tokyo (JP); Takumi Murata, Tokyo (JP); Takeshi Tsuda, Tokyo (JP); Akihisa Yoshino, Tokyo (JP); Daisuke Miyashita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/315,990

(22) Filed: May 10, 2021

(65) Prior Publication Data
US 2021/0381423 A1 Dec. 9, 2021

(30) Foreign Application Priority Data

Jun. 3, 2020 (JP) .............................. JP2020-096648

(51) Int. Cl.
F02B 31/04 (2006.01)
F02B 31/08 (2006.01)
(Continued)

(52) U.S. Cl.
CPC .............. F02B 31/04 (2013.01); F02B 31/06 (2013.01); F02B 31/085 (2013.01); F02F 1/4214 (2013.01); F02F 1/4242 (2013.01); F02M 35/108 (2013.01); F02M 35/1085 (2013.01); F02M 35/10255 (2013.01);
(Continued)

(58) Field of Classification Search
None
See application file for complete search history.

(56) References Cited

U.S. PATENT DOCUMENTS 3,861,376 A * 1/1975 Ashley .................. F02F 1/4242
123/188.2
4,320,725 A * 3/1982 Rychlik .................. F02B 31/06
123/188.14
(Continued)

FOREIGN PATENT DOCUMENTS

CN 1536201 A * 10/2004 .............. F02B 23/08
DE 10000111 A1 * 7/2000 .............. F02B 31/06
(Continued)

Primary Examiner — Kevin R Steckbauer
(74) Attorney, Agent, or Firm — McGinn I.P. Law Group, PLLC.

(57) ABSTRACT

An engine includes a combustion chamber, a cylinder head, an intake valve, a partition wall plate, and a tumble valve. The cylinder head includes an intake port that communicates with the combustion chamber. The intake valve includes a head configured to open and close an open end of the intake port. The partition wall plate partitions the intake port into first and second passages. The tumble valve is configured to open and close either one of the first passage and the second passage. A cross sectional shape of the partition wall plate is defined on a basis of a shape of a gap that is surrounded by a contour of the head and a contour of the open end, as viewed in a reference direction. The reference direction is a direction from a reference point in the intake port to a gap between the open end and the head.

14 Claims, 18 Drawing Sheets

(51) Int. Cl.
  *F02F 1/42* (2006.01)
  *F02M 35/10* (2006.01)
  *F02M 35/12* (2006.01)
  *F02M 35/108* (2006.01)
  *F02B 31/06* (2006.01)
  *F02F 1/24* (2006.01)
  *F02B 31/00* (2006.01)

(52) U.S. Cl.
  CPC .. *F02M 35/10262* (2013.01); *F02M 35/1211* (2013.01); *F02B 2031/006* (2013.01); *F02B 2275/48* (2013.01); *F02F 2001/245* (2013.01); *F02M 35/10118* (2013.01); *F02M 35/10124* (2013.01)

(56) References Cited

U.S. PATENT DOCUMENTS

| | | | | |
|---|---|---|---|---|
| 4,519,350 A * | | 5/1985 | Oda | F02M 35/10078 123/188.14 |
| 4,610,236 A * | | 9/1986 | Okino | F02B 27/0289 123/492 |
| 4,762,102 A * | | 8/1988 | Kanda | F02B 31/085 123/188.14 |
| 5,255,649 A * | | 10/1993 | Isaka | F02F 1/4221 123/188.14 |
| 6,478,008 B2 * | | 11/2002 | Wolters | F02F 1/4242 123/306 |
| 6,484,690 B2 * | | 11/2002 | Tokuyasu | F02D 41/0002 123/301 |
| 6,499,456 B1 * | | 12/2002 | Nogi | F02D 41/3029 123/638 |
| 6,634,333 B2 * | | 10/2003 | Fujieda | F02F 1/4242 123/308 |
| 6,705,279 B2 * | | 3/2004 | Iriya | F02B 31/08 123/301 |
| 6,705,280 B1 * | | 3/2004 | Lippert | F02B 31/06 123/308 |
| 6,886,516 B2 * | | 5/2005 | Harui | F02F 1/4242 123/193.5 |
| 6,918,372 B2 * | | 7/2005 | Nishii | F02B 31/08 123/308 |
| 6,928,997 B2 * | | 8/2005 | Yu | F02B 23/104 123/193.6 |
| 7,032,560 B2 * | | 4/2006 | Katou | F02B 31/08 123/193.5 |
| 7,051,702 B2 * | | 5/2006 | Sakai | F02M 35/10255 123/188.14 |
| 7,080,506 B2 * | | 7/2006 | Fukuzumi | F02M 26/38 60/299 |
| 7,128,050 B1 * | | 10/2006 | Abe | F02B 31/06 123/308 |
| 7,156,071 B2 * | | 1/2007 | Abe | F02F 1/4242 123/188.14 |
| 7,198,026 B2 * | | 4/2007 | Masuta | B22D 19/0009 123/308 |
| 7,506,632 B2 * | | 3/2009 | Suzuki | F02M 35/10262 123/403 |
| 7,762,229 B2 * | | 7/2010 | Abe | F02B 31/06 123/308 |
| 7,802,555 B2 * | | 9/2010 | Maeda | F02B 31/08 123/306 |
| 7,900,595 B2 * | | 3/2011 | Abe | F02D 9/1025 123/306 |
| 8,127,742 B2 * | | 3/2012 | Nogawa | F02B 31/06 123/184.55 |
| 9,797,298 B2 * | | 10/2017 | Suzuki | F02M 35/10255 |
| 10,174,727 B2 * | | 1/2019 | Chu | F02M 35/10262 |
| 10,273,911 B2 * | | 4/2019 | Sasaki | F02M 26/47 |
| 10,393,075 B2 * | | 8/2019 | Kato | F02M 35/10255 |
| 10,400,720 B2 * | | 9/2019 | Kato | F02M 35/1211 |
| 10,526,999 B2 * | | 1/2020 | Okino | F02M 35/10262 |
| 10,533,526 B2 * | | 1/2020 | Yamaguchi | F02M 35/10144 |
| 10,815,944 B2 * | | 10/2020 | Kato | F02M 35/10118 |
| 11,053,839 B2 * | | 7/2021 | Terunuma | F02M 35/10091 |
| 11,125,149 B2 * | | 9/2021 | Kato | F02F 1/425 |
| 11,225,930 B2 * | | 1/2022 | Naito | F02F 1/4242 |
| 2001/0022169 A1 * | | 9/2001 | Tokuyasu | F02F 1/4242 123/301 |
| 2001/0023677 A1 * | | 9/2001 | Fujieda | F02F 1/4242 123/301 |
| 2002/0020389 A1 * | | 2/2002 | Wolters | F02F 1/4242 123/188.14 |
| 2002/0078921 A1 * | | 6/2002 | Kim | F02D 9/10 123/308 |
| 2002/0124829 A1 * | | 9/2002 | Schweinzer | F02F 1/4242 123/306 |
| 2003/0062022 A1 * | | 4/2003 | Iriya | F02B 23/104 123/301 |
| 2004/0065297 A1 * | | 4/2004 | Sakai | F02M 35/10255 123/188.14 |
| 2004/0159314 A1 * | | 8/2004 | Ishizuka | F02M 25/06 123/572 |
| 2004/0211390 A1 * | | 10/2004 | Kim | F02B 31/08 123/188.14 |
| 2004/0226535 A1 * | | 11/2004 | Sakai | F02B 31/06 123/188.14 |
| 2004/0226536 A1 * | | 11/2004 | Sakai | F02F 1/38 123/188.14 |
| 2005/0051375 A1 * | | 3/2005 | Momosaki | F02M 35/10262 180/219 |
| 2005/0081821 A1 * | | 4/2005 | Katou | F02B 31/08 123/188.14 |
| 2005/0081822 A1 * | | 4/2005 | Yageta | F02B 31/08 123/188.14 |
| 2005/0082028 A1 * | | 4/2005 | Akaba | F02F 1/24 164/98 |
| 2005/0138918 A1 * | | 6/2005 | Fukuzumi | F02M 26/30 60/278 |
| 2005/0139190 A1 * | | 6/2005 | Yu | F02B 23/104 123/301 |
| 2005/0155570 A1 * | | 7/2005 | Confer | F02M 35/10262 123/184.56 |
| 2006/0048738 A1 * | | 3/2006 | Isaji | F02B 31/06 123/184.56 |
| 2006/0048739 A1 * | | 3/2006 | Isaji | F02B 31/06 123/184.56 |
| 2006/0219202 A1 * | | 10/2006 | Abe | F02F 1/4242 123/184.56 |
| 2009/0120400 A1 * | | 5/2009 | Abe | F02D 9/1025 123/184.56 |
| 2009/0235890 A1 * | | 9/2009 | Maeda | F02B 31/08 123/184.53 |
| 2009/0272355 A1 * | | 11/2009 | Nogawa | F02B 27/0215 123/184.55 |
| 2009/0272356 A1 * | | 11/2009 | Abe | F02B 31/06 123/184.56 |
| 2011/0131975 A1 * | | 6/2011 | Styles | F02M 26/01 123/90.15 |
| 2014/0165960 A1 * | | 6/2014 | Han | F02B 31/06 123/306 |
| 2014/0174401 A1 * | | 6/2014 | Hattori | F02B 31/06 123/337 |
| 2016/0333821 A1 * | | 11/2016 | Chu | F02M 35/10262 |
| 2017/0067392 A1 * | | 3/2017 | Suzuki | F02M 35/10255 |
| 2018/0135572 A1 * | | 5/2018 | Chu | F02M 35/10262 |
| 2018/0283327 A1 * | | 10/2018 | Sasaki | F02M 26/48 |
| 2018/0283329 A1 * | | 10/2018 | Kato | F02M 35/10262 |
| 2018/0283330 A1 * | | 10/2018 | Kato | F02M 35/1211 |
| 2019/0211773 A1 * | | 7/2019 | Okino | F02F 1/4214 |
| 2019/0226433 A1 * | | 7/2019 | Kato | F02M 35/10255 |
| 2019/0301410 A1 * | | 10/2019 | Ikeya | F02F 1/4242 |
| 2019/0353092 A1 * | | 11/2019 | Kato | F02F 1/425 |
| 2019/0360389 A1 * | | 11/2019 | Terunuma | F02M 35/10255 |
| 2021/0095615 A1 * | | 4/2021 | Naito | F02F 1/4235 |

(56) References Cited

U.S. PATENT DOCUMENTS

| | | | | |
|---|---|---|---|---|
| 2021/0381423 | A1* | 12/2021 | Kimoto | ............ F02M 35/1211 |
| 2022/0154630 | A1* | 5/2022 | Gautrot | ................ F02F 1/4235 |

FOREIGN PATENT DOCUMENTS

| | | | | |
|---|---|---|---|---|
| DE | 19907398 A1 | * | 8/2000 | ............ F02B 23/104 |
| DE | 19955906 A1 | * | 5/2001 | ............ F02B 31/085 |
| DE | 10024770 A1 | * | 1/2002 | ............ F02B 27/006 |
| DE | 10314236 A1 | * | 11/2004 | ............ F02B 29/083 |
| DE | 102005050508 A1 | * | 4/2007 | .............. F02B 31/06 |
| EP | 1101916 A2 | * | 5/2001 | ............ F02B 31/085 |
| EP | 1447533 A1 | * | 8/2004 | ........ F01M 13/0416 |
| EP | 1464805 A2 | * | 10/2004 | .............. F02B 23/08 |
| EP | 1464806 A2 | * | 10/2004 | .............. F02B 23/08 |
| EP | 1632660 A2 | * | 3/2006 | .............. F02B 31/06 |
| EP | 2101055 A1 | * | 9/2009 | .............. F02B 31/04 |
| EP | 2101055 B1 | * | 11/2011 | .............. F02B 31/04 |
| GB | 2283058 A | * | 4/1995 | .............. F02B 23/08 |
| GB | 2316712 A | * | 3/1998 | .............. F02B 23/08 |
| JP | H06-167220 A | | 6/1994 | |
| JP | 2001055925 A | * | 2/2001 | ............ F02M 61/14 |
| JP | 2001-193469 A | | 7/2001 | |
| JP | 2001193469 A | * | 7/2001 | ............ F02F 1/4242 |
| JP | 2001241329 A | * | 9/2001 | ............ F02B 17/005 |
| JP | 2001263067 A | * | 9/2001 | ............ F02M 61/14 |
| JP | 2005120995 A | * | 5/2005 | ................ B22C 9/10 |
| JP | 2006283696 A | * | 10/2006 | .............. F02B 31/06 |
| JP | 2007100640 A | * | 4/2007 | |
| JP | 2007100642 A | * | 4/2007 | |
| JP | 2008075509 A | * | 4/2008 | .............. F02B 31/04 |
| JP | 2008240521 A | * | 10/2008 | .............. F02B 31/06 |
| JP | 2017-150379 A | | 8/2017 | |
| JP | 2017150379 A | * | 8/2017 | |
| JP | 2018150815 A | * | 9/2018 | ............ F02B 23/104 |
| JP | 6439070 B1 | * | 12/2018 | .............. F02B 31/04 |
| JP | 2020012417 A | * | 1/2020 | |
| JP | 2020037903 A | * | 3/2020 | |
| JP | 2021032126 A | * | 3/2021 | |
| KR | 2003005999 A | * | 1/2003 | ............ F02M 61/14 |
| KR | 2004041308 A | * | 5/2004 | ............ F02M 61/14 |
| WO | WO-0049279 A1 | * | 8/2000 | ............ F02B 23/104 |
| WO | WO-2006106751 A1 | * | 10/2006 | .............. F02B 31/06 |
| WO | WO-2007132311 A2 | * | 11/2007 | ............ F02B 27/0215 |
| WO | WO-2018163909 A1 | * | 9/2018 | ............ F02B 23/104 |
| WO | WO-2018163912 A1 | * | 9/2018 | .............. F02B 31/04 |

\* cited by examiner

ENGINE

CROSS-REFERENCE TO RELATED APPLICATIONS

The present application claims priority from Japanese Patent Application No. 2020-096648 filed on Jun. 3, 2020, the entire contents of which are hereby incorporated by reference.

BACKGROUND

The disclosure relates to an engine including a combustion chamber.

To increase the thermal efficiency of an engine, a tumble flow is generated in a combustion chamber. Techniques for generating a tumble flow are known (refer to Japanese Unexamined Patent Applications Publication Nos. 2001-193469, H6-167220, and 2017-150379). In these techniques, a partition wall plate for defining a passage is provided in an intake port that introduces intake air into a combustion chamber. This partition wall plate adjusts a flow direction and a flow velocity of the intake air, whereby it is possible to generate a tumble flow in the combustion chamber, resulting in improvement in thermal efficiency.

SUMMARY

An aspect of the disclosure provides an engine including a combustion chamber, a cylinder head, an intake valve, a partition wall plate, and a tumble valve. The cylinder head includes an intake port that communicates with the combustion chamber. The intake valve includes a head that is configured to open and close an open end of the intake port. The partition wall plate partitions the intake port into a first passage and a second passage. The tumble valve is configured to open and close one of the first passage and the second passage. A cross sectional shape of the partition wall plate is defined on a basis of a shape of a gap that is surrounded by a contour of the head and a contour of the open end, as viewed in a reference direction. The reference direction is a direction from a reference point in the intake port to a gap between the open end and the head.

An aspect of the disclosure provides an engine including a combustion chamber, a cylinder head, a first intake valve, a second intake valve, a partition wall plate, and a tumble valve. The cylinder head includes an intake port that includes a common port section branching off into a first port section and a second port section. The first intake valve is configured to open and close a first open end of the first port section that communicates with the combustion chamber. The second intake valve is configured to open and close a second open end of the second port section that communicates with the combustion chamber. The partition wall plate partitions the intake port into a first passage and a second passage. The tumble valve is configured to open and close the first passage.

The partition wall plate includes a common plate section positioned at the common port section, a first plate section positioned at the first port section, and a second plate section positioned at the second port section. The second passage at the common port section, which is defined by the common plate section, includes a width-direction center part having a passage cross sectional area larger than a passage cross sectional area of a width-direction outer part. The second passage at the first port section, which is defined by the first plate section, includes a width-direction inner part having a passage cross sectional area larger than a passage cross sectional area of a width-direction outer part. The second passage at the second port section, which is defined by the second plate section, includes a width-direction inner part having a passage cross sectional area larger than a passage cross sectional area of a width-direction outer part.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
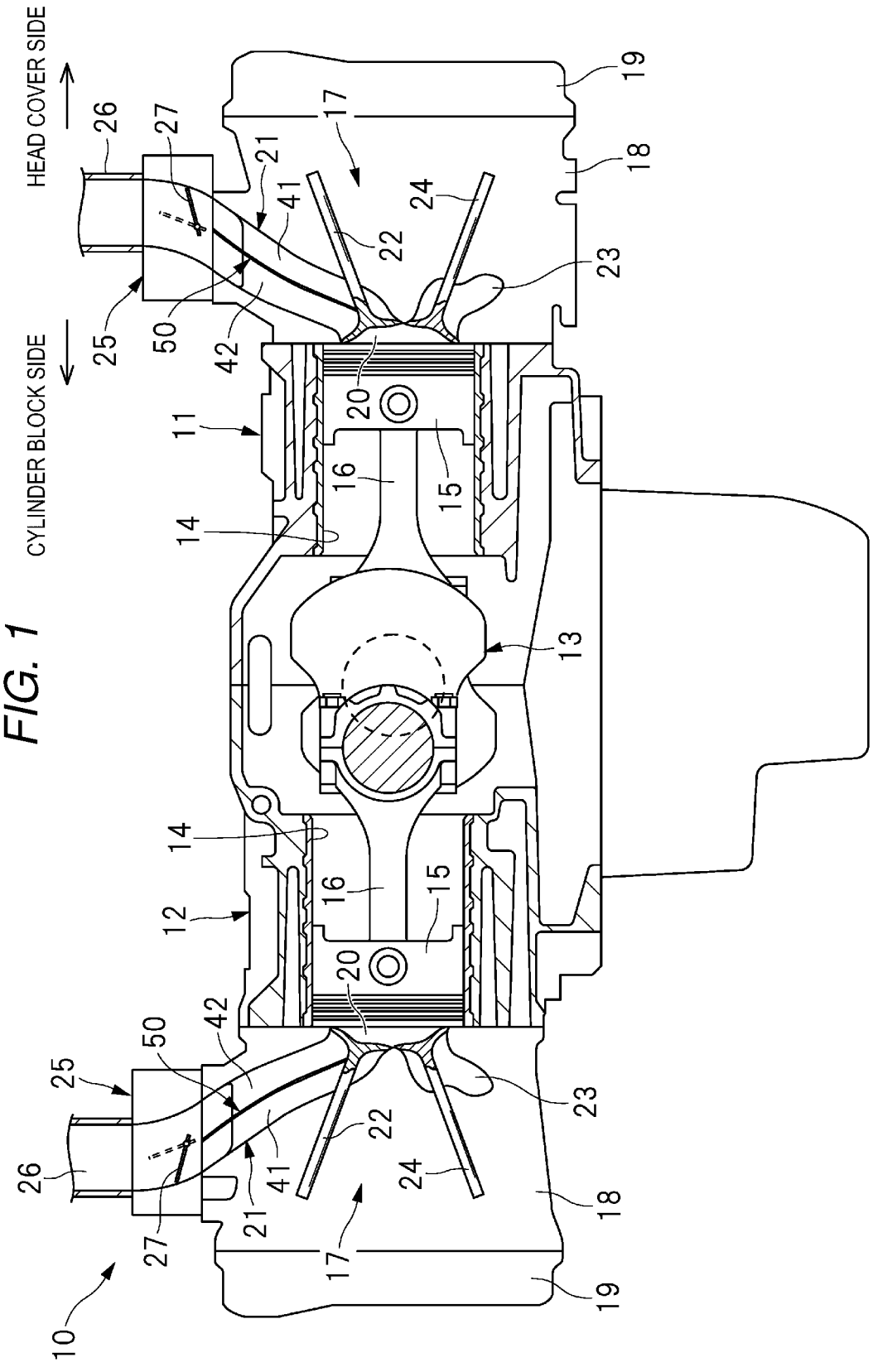
FIG. 1 is a schematic diagram illustrating an engine according to an embodiment of the disclosure.

The thermal efficiency of an engine is constantly desired to be improved. For this reason, the shape of a partition wall plate is more suitably set in order to generate a strong tumble flow in a combustion chamber.

It is desirable to generate a strong tumble flow in a combustion chamber.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale.

Throughout the present specification and the drawings, elements having substantially the same function and configuration are denoted with the same numerals to avoid any redundant description.

Note that an engine 10 illustrated in the drawings is a horizontally-opposed engine, but not limited thereto, and the embodiments of the disclosure can be used in an inline engine, a V engine, or other type of engine.

Structure of Engine

FIG. 1 is a schematic diagram illustrating the engine 10 according to an embodiment of the disclosure. As illustrated in FIG. 1, the engine 10 includes a cylinder block 11 provided to one cylinder bank, a cylinder block 12 provided to the other cylinder bank, and a crankshaft 13 supported by the pair of the cylinder blocks 11 and 12. Each of the cylinder blocks 11 and 12 has a cylinder bore 14 that houses a piston 15. The piston 15 is coupled to the crankshaft 13 via a connecting rod 16.

Each of the cylinder blocks 11 and 12 is assembled with a cylinder head 18 that has a valve driving mechanism 17. The cylinder head 18 is assembled with a head cover 19 that covers the valve driving mechanism 17. The cylinder head 18 includes an intake port 21 that communicates with a combustion chamber 20, and the cylinder head 18 is assembled with an intake valve 22 that opens and closes the intake port 21. The cylinder head 18 also includes an exhaust port 23 that communicates with the combustion chamber 20, and the cylinder head 18 is assembled with an exhaust valve 24 that opens and closes the exhaust port 23.

Moreover, the cylinder head 18 is assembled with a valve unit 25 and an intake manifold 26, and intake air is guided to the intake port 21 via these intake manifold 26 and valve unit 25. As described later, the valve unit 25 is provided with a tumble valve 27, called tumble generation valve (TGV) and so on, in order to generate a tumble flow in the combustion chamber 20. The cylinder head 18 is assembled with an exhaust manifold, which is not illustrated, and exhaust gas from the exhaust port 23 is guided via the exhaust manifold to a catalytic converter and other components, which are not illustrated.

Structure of Inlet System

Figure 2:
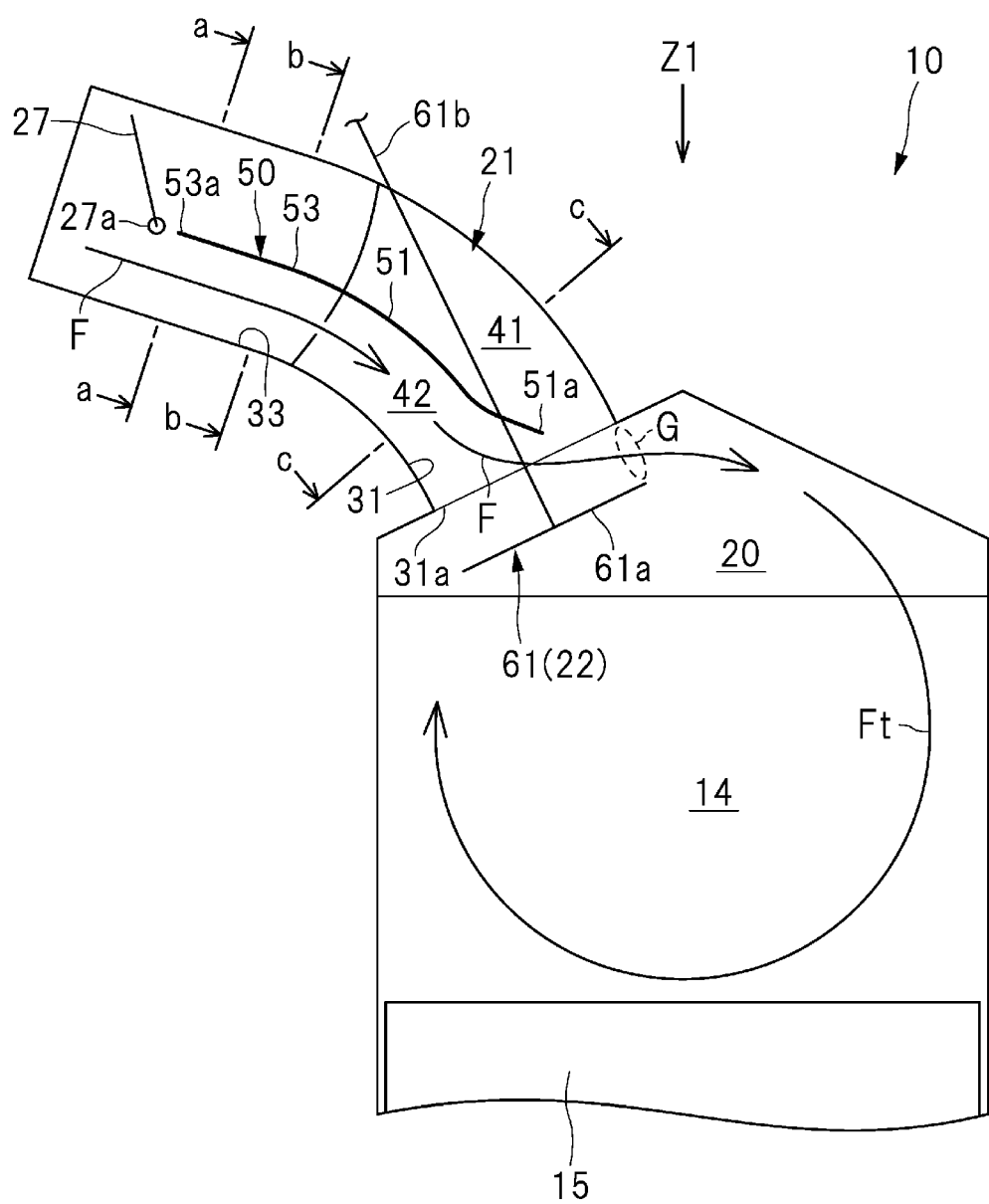
FIG. 2 simply illustrates an intake port and a combustion chamber.
Figure 3:
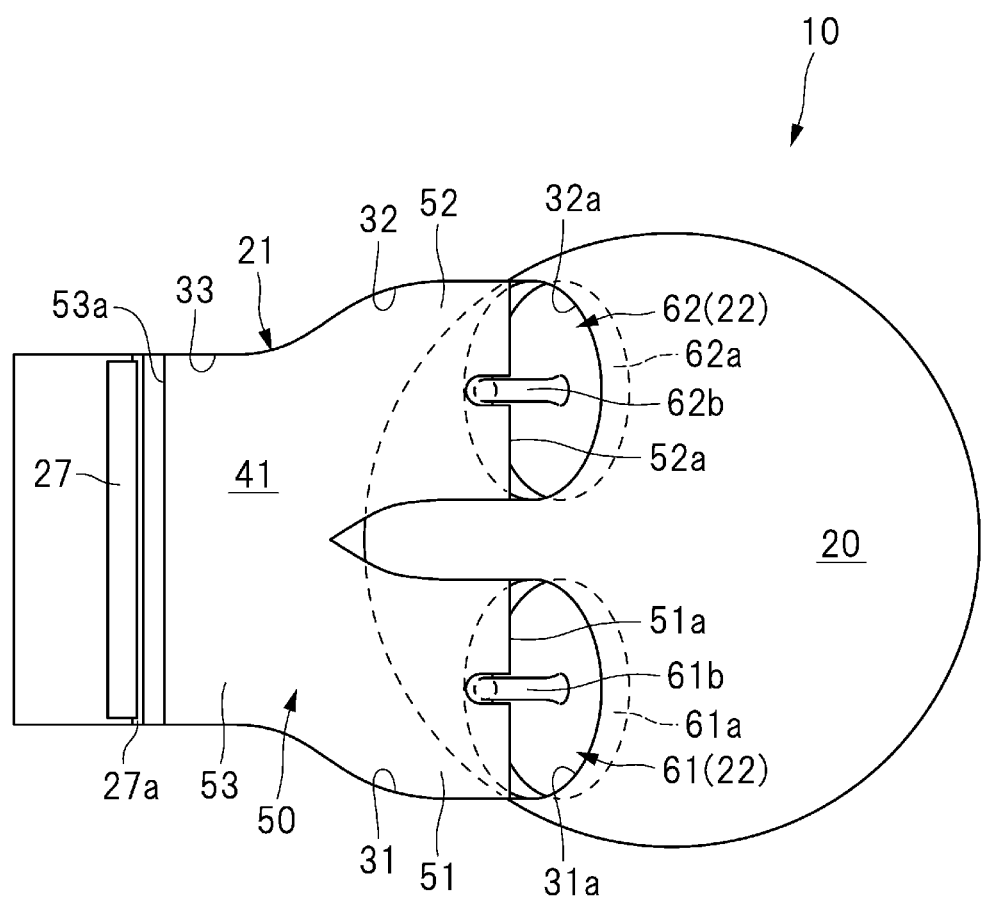
FIG. 3 simply illustrates an inside of the intake port from an arrow Z1 direction in FIG. 2.

An inlet system for guiding intake air to the combustion chamber 20 will be described. FIG. 2 simply illustrates the intake port 21 and the combustion chamber 20. FIG. 3 simply illustrates the inside of the intake port 21 from the arrow Z1 direction in FIG. 2. Note that the pair of the intake valves 22, which are assembled to the cylinder head 18, are respectively represented as a "first intake valve 61" and a "second intake valve 62" in the following descriptions.

As illustrated in FIGS. 1 to 3, the intake port 21 of the cylinder head 18 has a common port section 33 on an upstream side, a first port section 31 that is branched off from the common port section 33, and a second port section 32 that is branched off from the common port section 33. The intake port 21, which thus branches off to the combustion chamber 20, is provided with a partition wall plate 50 that partitions the inside of the intake port 21 into a first passage 41 on a head cover 19 side and a second passage 42 on a side of a cylinder block 11 or 12. The partition wall plate 50 has a common plate section 53 that is contained in the common port section 33, a first plate section 51 that is contained in the first port section 31, and a second plate section 52 that is contained in the second port section 32.

As illustrated in FIGS. 2 and 3, an open end 31a of the first port section 31 is opened and closed by a head 61a of the first intake valve 61, and an open end 32a of the second port section 32 is opened and closed by a head 62a of the second intake valve 62. In one example, the open end 31a may serve as a "first open end", and the open end 32a may serve as a "second open end". In addition, an end 51a of the first plate section 51, which is contained in the first port section 31, is positioned closer to the open end 31a than a stem 61b of the first intake valve 61, and an end 52a of the second plate section 52, which is contained in the second port section 32, is positioned closer to the open end 32a than a stem 62b of the second intake valve 62. The partition wall plate 50, which is provided in the intake port 21, may be provided separately from the cylinder head 18 or may be integrated with the cylinder head 18 into one body. In the case of integrating the partition wall plate 50 with the cylinder head 18 into one body, the partition wall plate may be integrated by casting or by using a 3D printer.

As illustrated in FIGS. 1 and 2, the valve unit 25, which is mounted to the cylinder head 18, is provided with the tumble valve 27 that moves to a close position represented by the solid line and to an open position represented by the broken line. As illustrated in FIG. 2, the tumble valve 27 that is moved to the close position closes the first passage 41, whereby intake air flowing from the intake manifold 26 into the intake port 21 is guided by the tumble valve 27 to the combustion chamber 20 via the second passage 42 of the intake port 21. In more detail, moving the tumble valve 27 to the close position causes most of intake air to pass through the second passage 42 of the intake port 21, as illustrated by the arrow F in FIG. 2, whereby the intake air flows into the combustion chamber 20 while being increased in flow velocity. Moreover, the intake air flows along the partition wall plate 50 and thereby advances to a gap G between the intake port 21 and the intake valve 61. Thus, the intake air smoothly flows along an inner wall of the combustion chamber 20, as illustrated by the arrow Ft, resulting in generation of a strong tumble flow in the combustion chamber 20 and in the cylinder bore 14.

In this manner, the tumble valve 27, which generates a tumble flow in the combustion chamber 20, is moved to the close position to narrow the passage in the intake port 21, for example, in the case in which an engine load is low, and an intake air flow rate is low. With this function, even in the situation in which the engine load is low, and flow velocity of intake air tends to decrease, it is possible to aggressively generate a tumble flow in the combustion chamber 20, whereby combustion efficiency of air-fuel mixture can be increased, and thermal efficiency of the engine 10 can be improved. On the other hand, for example, in the situation in which the engine load is high, and the intake air flow rate is high, the tumble valve 27 is moved to the open position to open the first passage 41. This causes the intake air, which flows from the intake manifold 26 into the intake port 21, to be guided to the combustion chamber 20 via the first passage 41 and the second passage 42 of the intake port 21, whereby a lot of intake air is supplied to the combustion chamber 20.

Figure 4A:
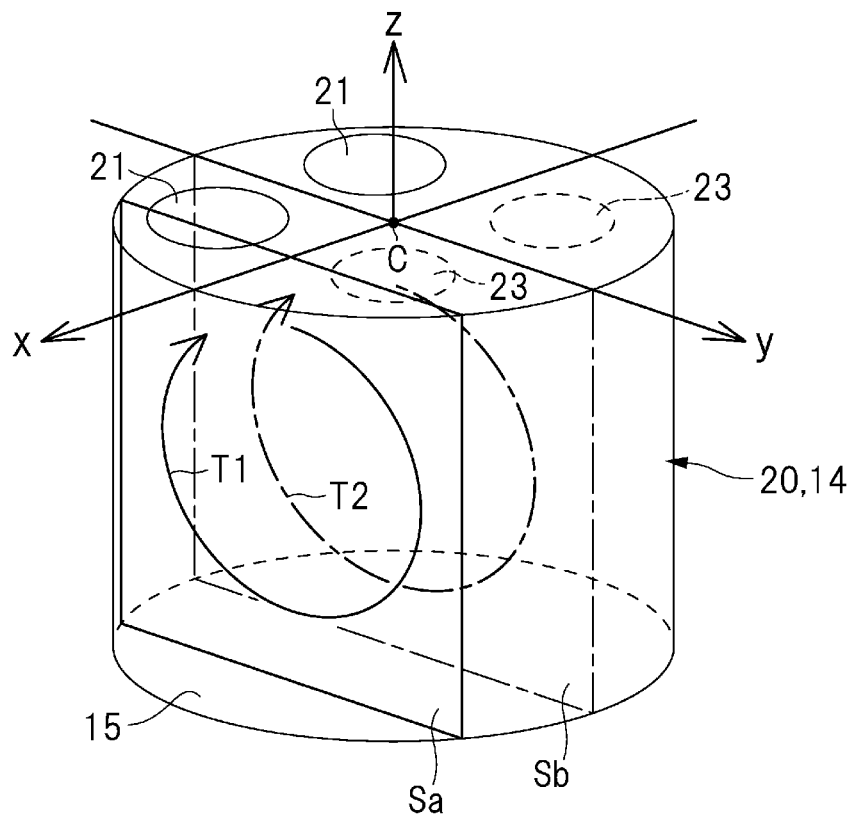
FIG. 4A simply illustrates a coordinate system of the combustion chamber.
Figure 4B:
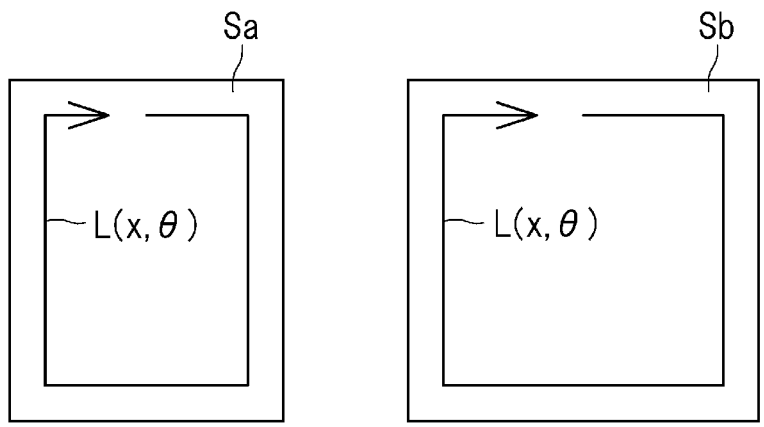
FIG. 4B simply illustrates flows of intake air in the combustion chamber.
Figure 5A:
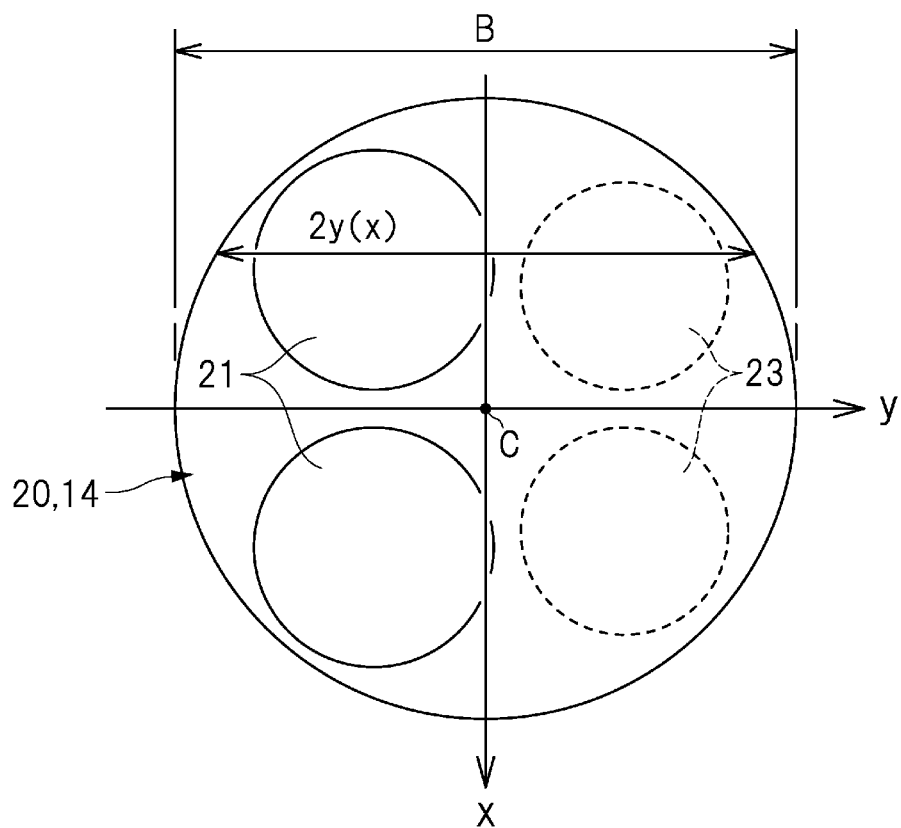
FIGS. 5A and 5B simply illustrate each dimension relating to the combustion chamber and a cylinder bore.
Figure 5B:
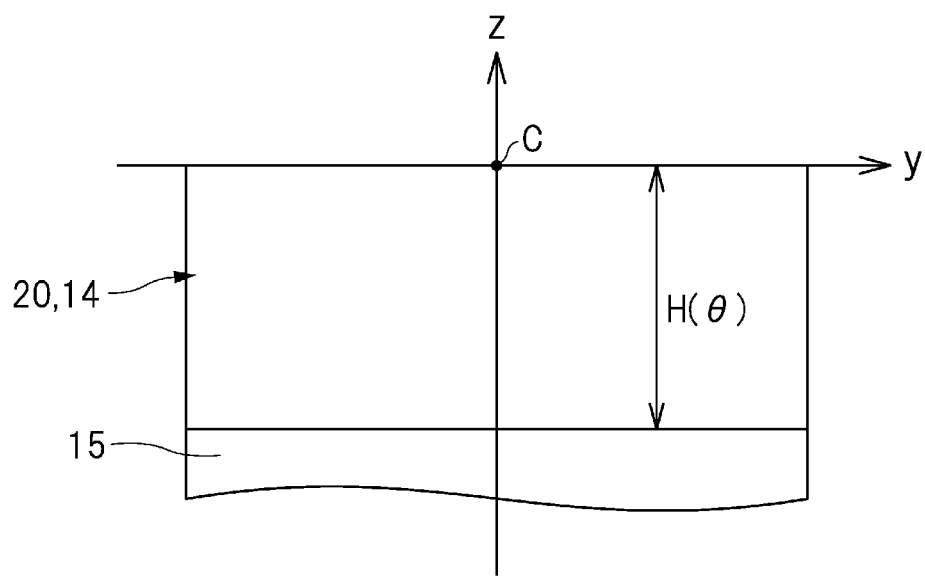

Ideal Flow Velocity Distribution of Intake Air FIG. 4A simply illustrates a coordinate system of the combustion chamber 20. FIG. 4B simply illustrates flows of intake air in the combustion chamber 20. FIGS. 5A and 5B simply illustrate each dimension relating to the combustion chamber 20 and the cylinder bore 14. Note that, in FIGS. 4A to 5B, parts of the combustion chamber 20 and the cylinder bore 14 are illustrated by a columnar shape, for easy explanation.

As illustrated in FIG. 4A, an x-axis, a y-axis, and a z-axis are set as mutually orthogonal coordinate axes that pass a center point C in an upper surface of the combustion chamber 20. The y-axis is a coordinate axis parallel to a direction from the intake port 21 to the exhaust port 23, which is a direction from the intake side to the exhaust side. The z-axis is a coordinate axis coinciding with a center line of the cylinder bore 14. The x-axis is a coordinate axis orthogonal to both of the y-axis and the z-axis.

Herein, ideal tumble flows are tumble flows T1 and T2 that circulate along cross sections Sa and Sb coinciding with or parallel to a yz coordinate plane. That is, in order to increase thermal efficiency of the engine 10, it is desirable to generate a tumble flow that circulates along each cross section coinciding with or parallel to the yz coordinate plane. Hereinafter, each cross section is described as a "yz cross section". To generate such a tumble flow, intake air is made to flow in the combustion chamber 20 so that flow velocity will be proportional to a circulation distance of the tumble flow in each yz cross section, as described later.

From this point of view, a flow velocity distribution of intake air by which an ideal tumble flow is obtained, is investigated. Assuming that a circulation center of a tumble flow is at the center of each yz cross section, and the tumble flow flows along an inner wall surface, a circulation distance of the tumble flow in each yz cross section differs with respect to each x coordinate. Herein, as illustrated by the arrow in FIG. 4B, the circulation distance of the tumble flow, which is a length $L(x, \theta)$ in the circumferential direction of each yz cross section, is calculated based on the following formulas (1) and (2). In this case, as illustrated in FIGS. 5A and 5B, the symbol "B" represents a cylinder bore diameter, the symbol "$H(\theta)$" represents a distance from a crown surface of the piston 15 to the upper surface of the combustion chamber 20, which varies in accordance with a crank angle $\theta$.

$$y(x) = \sqrt{\left(\frac{B}{2}\right)^2 - x^2} \quad (1)$$

$$L(x, \theta) = 2 \cdot 2y(x) + 2H(\theta) \quad (2)$$

Figure 6A:
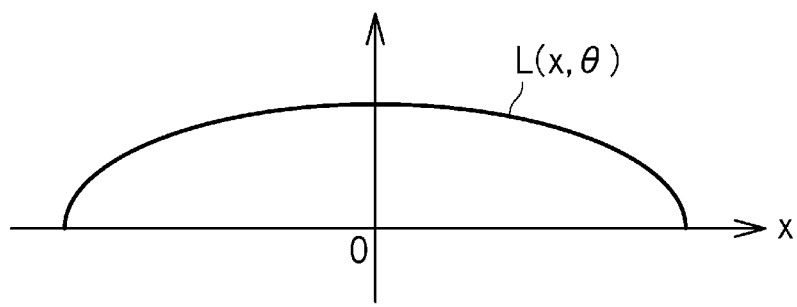
FIG. 6A illustrates an example of a length in a circumferential direction of a yz cross section.
Figure 6B:
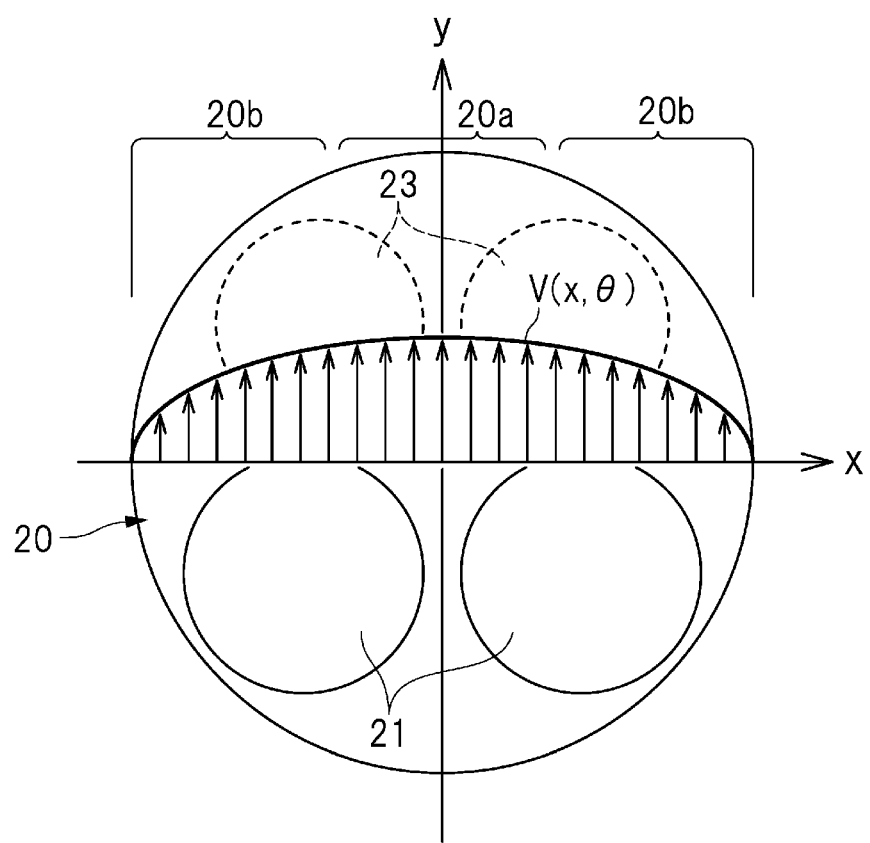
FIG. 6B illustrates an example of a flow velocity distribution of intake air.

FIG. 6A illustrates an example of the length $L(x, \theta)$ in the circumferential direction of a yz cross section. FIG. 6B illustrates an example of a flow velocity distribution $V(x, \theta)$ of intake air. As illustrated in FIG. 6A, the length $L(x, \theta)$ in the circumferential direction of the yz cross section is shorter as x goes to a positive side and to a negative side and is maximum when x=0. As described above, from the point of view of generating an ideal tumble flow, in order to make the tumble flow circulate along each yz cross section, the flow velocity distribution of the intake air in the x-axis direction is desirably proportional to the length $L(x, \theta)$ in the circumferential direction. In other words, it is desirable that the flow velocity of the intake air is increased at a width-direction center part 20a of the combustion chamber 20, whereas the flow velocity of the intake air is decreased at width-direction end parts 20b of the combustion chamber 20, as illustrated in FIG. 6B. The width-direction center part 20a of the combustion chamber 20 is a center part in the x-axis direction of the combustion chamber 20, whereas the width-direction end parts 20b of the combustion chamber 20 are both end parts in the x-axis direction of the combustion chamber 20. The flow velocity distribution $V(x, \theta)$ of intake air, by which an ideal tumble flow is obtained, is calculated based on the following formula (3). Herein, the symbol "a" represents a time during which the tumble flow circulates in the combustion chamber 20.

$$V(x, \theta) = \frac{L(x, \theta)}{a} \quad (3)$$

Cross Sectional Shape of Partition Wall Plate

As described by using FIG. 6B, in order to generate an ideal tumble flow, the flow velocity of the intake air is increased at the width-direction center part 20a of the combustion chamber 20, whereas the flow velocity of the intake air is decreased at the width-direction end parts 20b of the combustion chamber 20. In consideration of this, the cross sectional shape of the partition wall plate 50, which partitions the inside of the intake port 21, is set so that the flow velocity distribution of the intake air will be similar to the ideal flow velocity distribution $V(x, \theta)$. Note that the alternate long and short dash line illustrated in FIGS. 7B and 7C shows an example of a passage cross sectional area in each part in the passage 42.

Figure 7A:
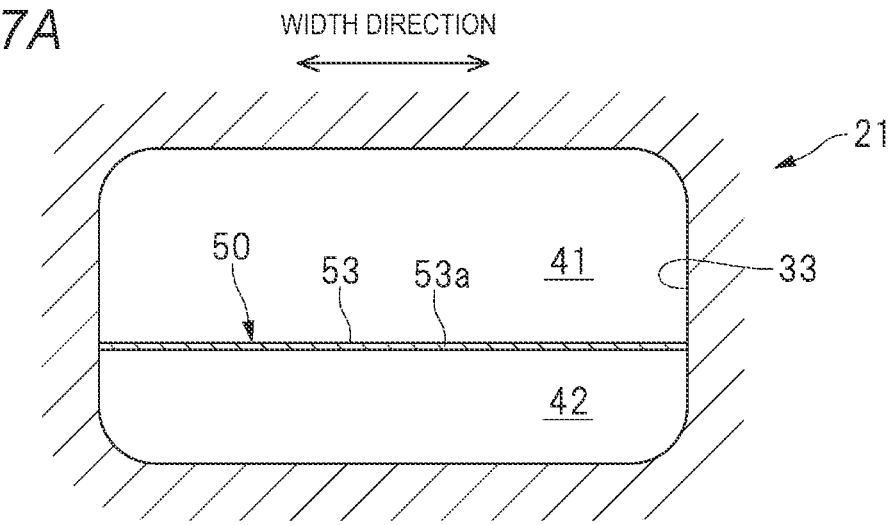
FIG. 7A is a sectional view along a line a-a in FIG. 2.
Figure 7B:
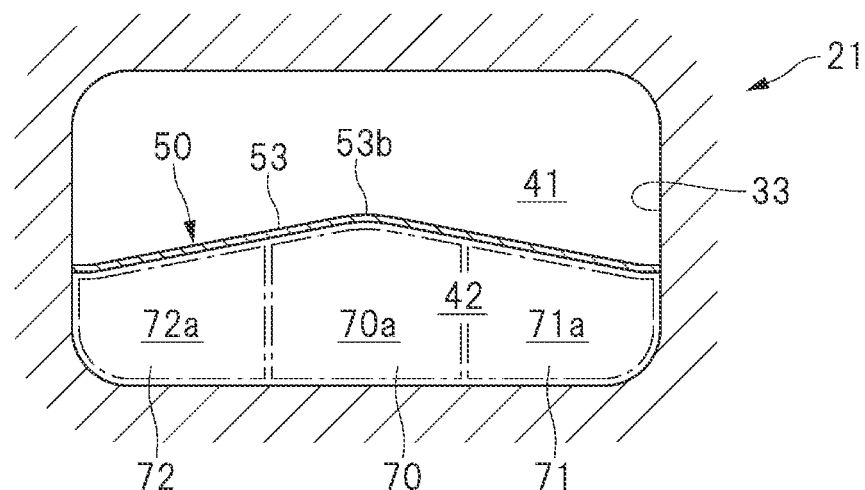
FIG. 7B is a sectional view along a line b-b in FIG. 2.

FIG. 7A is a sectional view along a line a-a in FIG. 2. FIG. 7B is a sectional view along a line b-b in FIG. 2. FIG. 7C is a sectional view along a line c-c in FIG. 2. As illustrated in FIG. 7A, an upstream end 53a of the partition wall plate 50 in the vicinity of the tumble valve 27 is formed flat along a turn axis 27a of the tumble valve 27. In addition, as illustrated in FIG. 7B, the common plate section 53 of the partition wall plate 50 is bent in such a manner that a width-direction center part 53b protrudes to the first passage 41. That is, in the second passage 42 of the common port section 33, which is defined by the common plate section 53, a passage cross sectional area 70a of a width-direction center part 70 is set larger than each of a passage cross sectional area 71a of a width-direction outer part 71 and a passage cross sectional area 72a of a width-direction outer part 72. The width-direction center part 70 and the width-direction outer parts 71 and 72 illustrated in the drawing are obtained by trisecting the second passage 42 of the common port section 33 in the width direction.

Figure 7C:
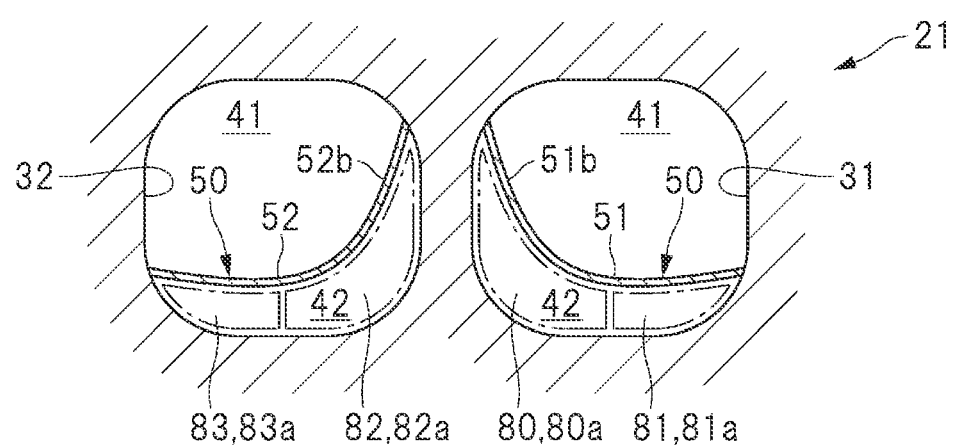
FIG. 7C is a sectional view along a line c-c in FIG. 2.

As illustrated in FIG. 7C, the first plate section 51 of the partition wall plate 50 is bent in such a manner that a width-direction inner part 51b protrudes to the first passage 41. That is, in the second passage 42 of the first port section 31, which is defined by the first plate section 51, a passage cross sectional area 80a of a width-direction inner part 80 is set larger than a passage cross sectional area 81a of a width-direction outer part 81. The second plate section 52 of the partition wall plate 50 is bent in such a manner that a width-direction inner part 52b protrudes to the first passage 41. That is, in the second passage 42 of the second port section 32, which is defined by the second plate section 52, a passage cross sectional area 82a of a width-direction inner part 82 is set larger than a passage cross sectional area 83a of a width-direction outer part 83. The width-direction inner part 80 and the width-direction outer part 81 illustrated in the drawing are obtained by bisecting the second passage 42 of the first port section 31 in the width direction. The width-direction inner part 82 and the width-direction outer part 83 illustrated in the drawing are obtained by bisecting the second passage 42 of the second port section 32 in the width direction.

The cross sectional shape of the partition wall plate 50 for partitioning the intake port 21 is set in this manner. Thus, in the case in which the tumble valve 27 is closed to guide the intake air to the second passage 42, a flow rate of the intake air flowing to the width-direction center part 20a of the combustion chamber 20 is increased, and flow velocity of the intake air is increased at the width-direction center part 20a of the combustion chamber 20. In short, most of the intake air that flows into the intake port 21 via the valve unit 25, flows to the width-direction center part 70 of the common port section 33. At this time, a lot of intake air flows at the width-direction inner part 80 of the first port section 31, and a lot of intake air flows at the width-direction inner part 82 of the second port section 32.

Figure 8:
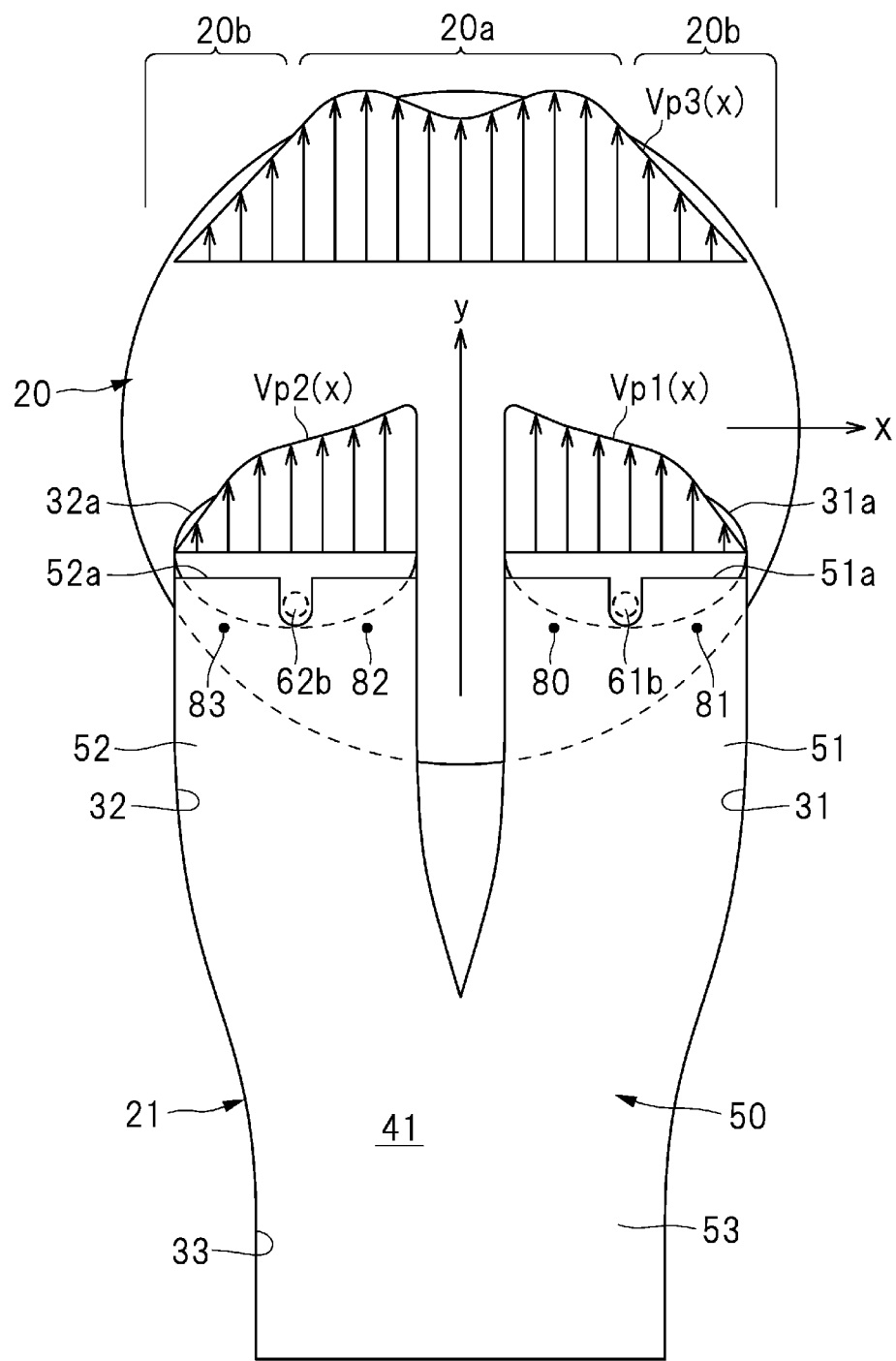
FIG. 8 illustrates a flow velocity distribution of intake air flowing from the intake port into the combustion chamber.

FIG. 8 illustrates a flow velocity distribution of the intake air flowing from the intake port 21 into the combustion chamber 20. As described above, a lot of intake air flows at the width-direction inner part 80 of the first port section 31, and a lot of intake air flows at the width-direction inner part 82 of the second port section 32. Thus, in a flow velocity distribution $Vp1(x)$ of the intake air at the open end 31a of the first port section 31, flow velocity at the width-direction inner part 80 is higher than that at the width-direction outer part 81. Similarly, in a flow velocity distribution $Vp2(x)$ of the intake air at the open end 32a of the second port section 32, flow velocity at the width-direction inner part 82 is higher than that at the width-direction outer part 83. As a result, also in a flow velocity distribution $Vp3(x)$ of intake air combined in the combustion chamber 20, flow velocity at the width-direction center part 20a is higher than flow velocities at the width-direction end parts 20b. That is, the flow velocity distribution $Vp3(x)$ of the intake air illustrated in FIG. 8 is similar to the flow velocity distribution $V(x, \theta)$ of the intake air illustrated in FIG. 6B, whereby a strong tumble flow can be generated in the combustion chamber 20.

In addition, the end 51a of the first plate section 51, which is contained in the first port section 31, is positioned closer to the open end 31a than the stem 61b of the first intake valve 61, and the end 52a of the second plate section 52, which is contained in the second port section 32, is positioned closer to the open end 32a than the stem 62b of the second intake valve 62. Thus, the partition wall plate 50 is extended to the vicinity of the open ends 31a and 32a. This enables appropriately controlling the intake air immediately before the intake air flows into the combustion chamber 20, resulting in generation of a strong tumble flow in the combustion chamber 20.

Procedure of Setting Cross Sectional Shape of Partition Wall Plate

Figure 9:
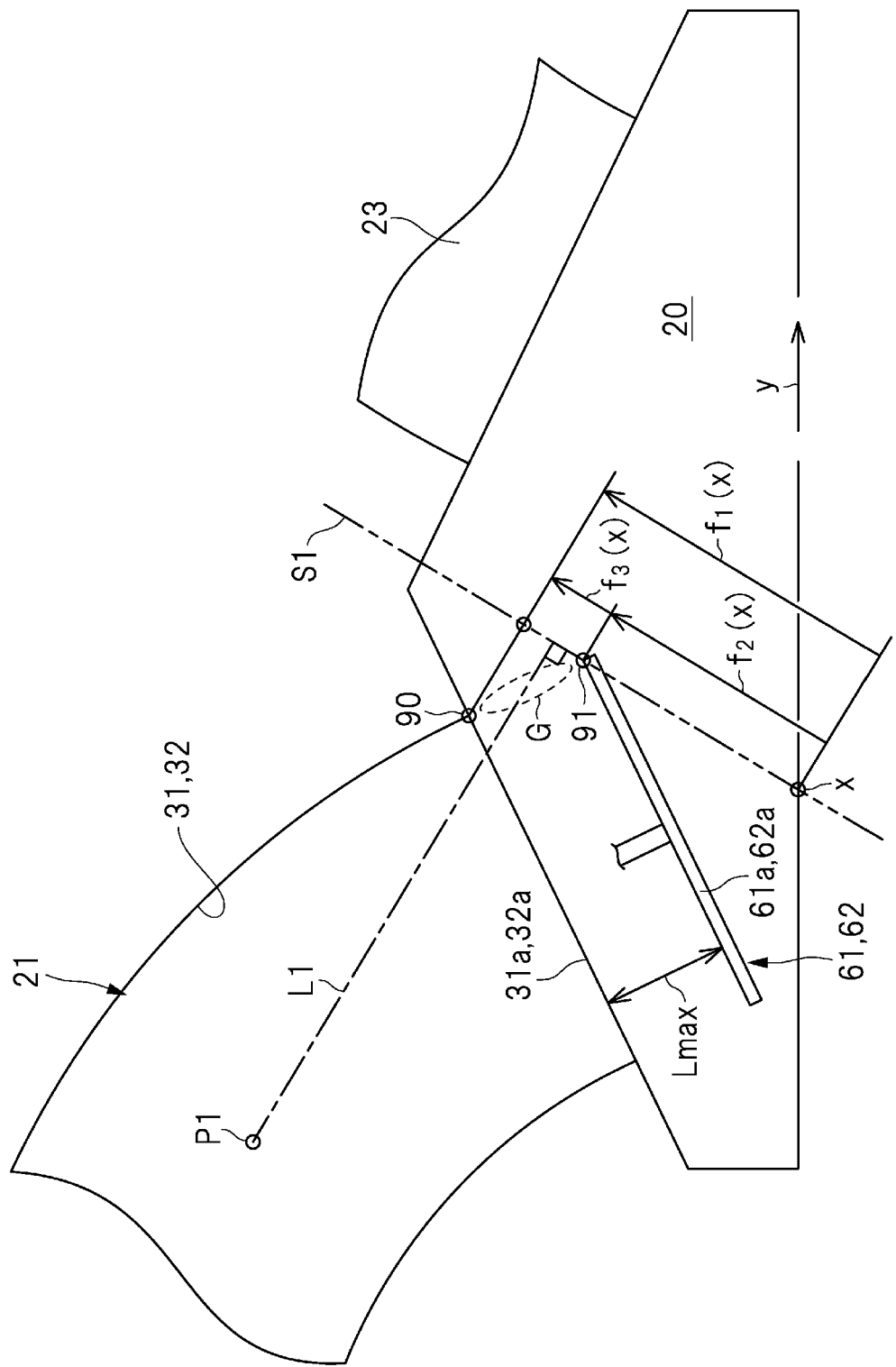
FIG. 9 illustrates an example of a coordinate plane set in the combustion chamber.
Figure 10:
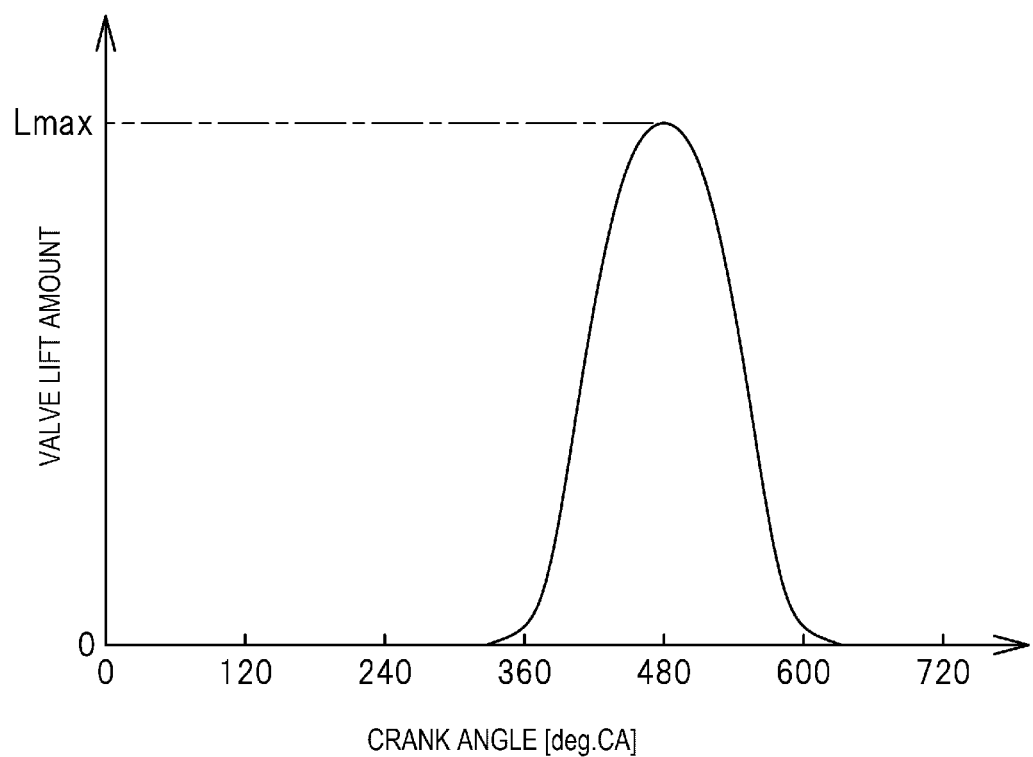
FIG. 10 illustrates an example of a lift curve of an intake valve.
Figure 11A:
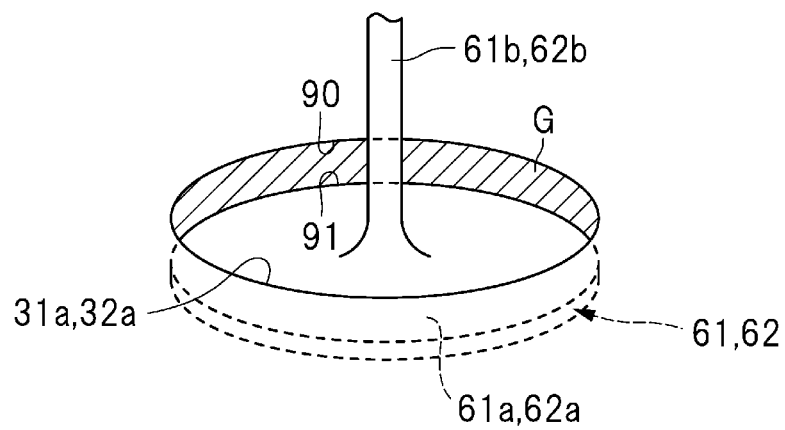
FIG. 11A illustrates a gap between the intake port and the intake valve.
Figure 11B:
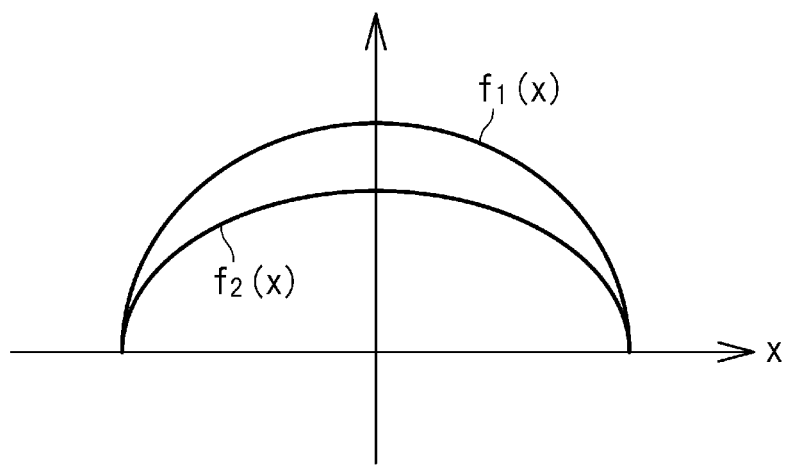
FIG. 11B illustrates contours of the intake port and the intake valve.
Figure 11C:
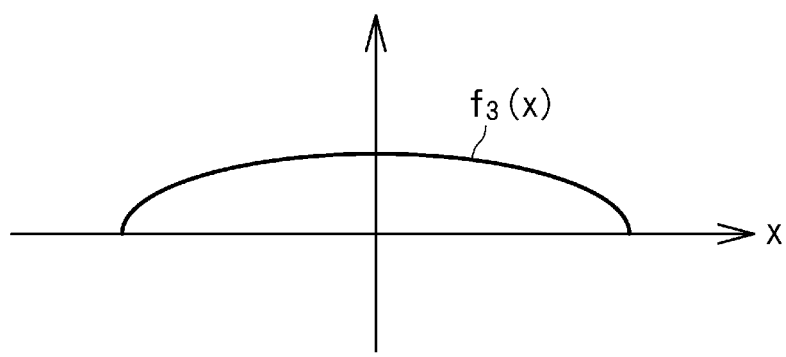
FIG. 11C illustrates a shape of the gap between the intake port and the intake valve.

Next, a procedure of setting a cross sectional shape of the partition wall plate 50 will be described from the point of view of the ideal flow velocity distribution $V(x, \theta)$ of the intake air. FIG. 9 illustrates an example of a coordinate plane S1 set in the combustion chamber 20. FIG. 10 illustrates an example of a lift curve of the intake valve 61 or 62. FIG. 11A illustrates a gap G between the intake port 21 and the intake valve 61 or 62. FIG. 11B illustrates contours of the intake port 21 and the intake valve 61 or 62. FIG. 11C illustrates a shape of the gap between the intake port 21 and the intake valve 61 or 62.

As illustrated in FIG. 9, a coordinate plane S1 is set in the vicinity of the open end 31a or 32a of the intake port 21. The coordinate plane S1 is orthogonal to a straight line L1 that extends from a reference point P1 in the intake port 21 to the gap G between the open end 31a or 32a and the corresponding head 61a or 62a. The heads 61a and 62a illustrated in the drawing are opened by the maximum lift amount Lmax, which is illustrated in FIG. 10. The coordinate plane S1 contains an x-axis as a coordinate axis. This x-axis is a coordinate axis orthogonal to the direction from the intake port 21 to the exhaust port 23, which is the arrow y direction from the intake side to the exhaust side. Note that the following describes the coordinate axis indicated by the symbol "x" in FIG. 9, as the x-axis.

FIG. 11A illustrates the open ends 31a and 32a and the heads 61a and 62a as viewed in a direction from the reference point P1 in the intake port 21 to the gap G. In other words, FIG. 11A illustrates the open ends 31a and 32a and the heads 61a and 62a as viewed in the direction from the reference point P1 along the straight line L1, which is illustrated in FIG. 9. In one example, this direction may serve as a "reference direction". As illustrated by the arrow F in FIG. 2, most of the intake air flowing from the intake port 21 into the combustion chamber 20 passes through the gap G between the intake port 21 and the intake valve 61 or 62. In more detail, a gap G is provided between an exhaust side end 90 of the open end 31a or 32a and an exhaust side end 91 of the corresponding head 61a or 62a, as illustrated by the hatching in FIG. 11A, and the intake air passes through this gap G to flow from the intake port 21 into the combustion chamber 20. In consideration of this, in order to control the flow rate and the flow velocity of the intake air flowing in the combustion chamber 20, the cross sectional shapes of the first and second plate sections 51 and 52 constituting the partition wall plate 50 are determined based on the shapes of the gaps surrounded by the contours of the open ends 31a and 32a and the contours of the corresponding heads 61a and 62a.

From this point of view, in accordance with the following procedure, the cross sectional shapes of the first and second plate sections 51 and 52 constituting the partition wall plate 50 are set based on the shapes of the gaps surrounded by the contours of the open ends 31a and 32a and the contours of the corresponding heads 61a and 62a. Herein, the function $f_1(x)$ illustrated in FIG. 11B specifies the contour of the open end 31a or 32a that is projected on the coordinate plane S1, based on x, the function $f_2(x)$ illustrated in FIG. 11B specifies the contour of the head 61a or 62a that is projected on the coordinate plane S1, based on x, and the function $f_3(x)$ illustrated in FIG. 11C specifies a gap shape that is projected on the coordinate plane S1, based on x. In other words, the gap shape $f_3(x)$ illustrated in FIG. 11C is the shape of the gap surrounded by the contour of the open end 31a or 32a and the contour of the corresponding head 61a or 62a. Thus, as illustrated in FIG. 9, the gap shape $f_3(x)$ between the open end 31a or 32a and the corresponding head 61a or 62a is calculated by subtracting the contour $f_2(x)$ of the corresponding head 61a or 62a from the contour $f_1(x)$ of the open end 31a or 32a. That is, the gap shape $f_3(x)$ through which the intake air passes is calculated based on the following formula (4). Note that each shape is projected on the coordinate plane S1 along a line orthogonal to the coordinate plane S1.

$$f_3(x)=f_1(x)-f_2(x) \tag{4}$$

Figure 12:
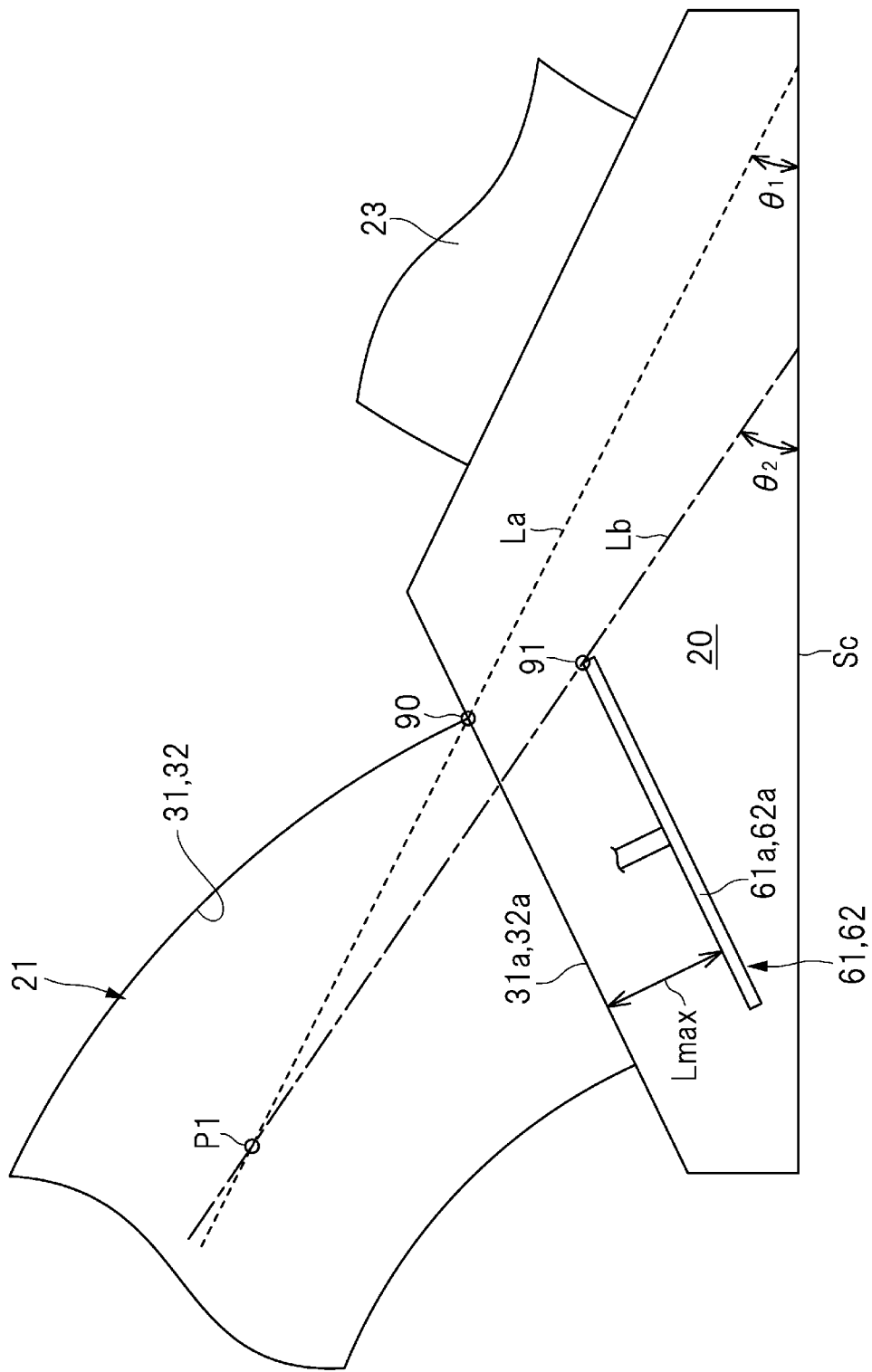
FIG. 12 simply illustrates the intake port and the combustion chamber.

FIG. 12 simply illustrates the intake port 21 and the combustion chamber 20. As illustrated in FIG. 12, a straight line La connecting the reference point P1 in the intake port 21 and the exhaust side end 90 of the open end 31a or 32a is set, and a straight line Lb connecting the reference point P1 in the intake port 21 and the exhaust side end 91 of the head 61a or 62a is also set. In addition, it is assumed that an angle between the straight line La and a reference plane Sc is represented as "θ1", and an angle between the straight line Lb and the reference plane Sc is represented as "θ2". In these conditions, the gap shape $f_3(x)$ may be calculated based on the following formula (5). In this case, the reference plane Sc is a flat plane orthogonal to the center line of the cylinder bore 14.

$$f_3(x)=f_2(x)\cdot\sin(\theta_2-\theta_1) \tag{5}$$

Figure 13A:
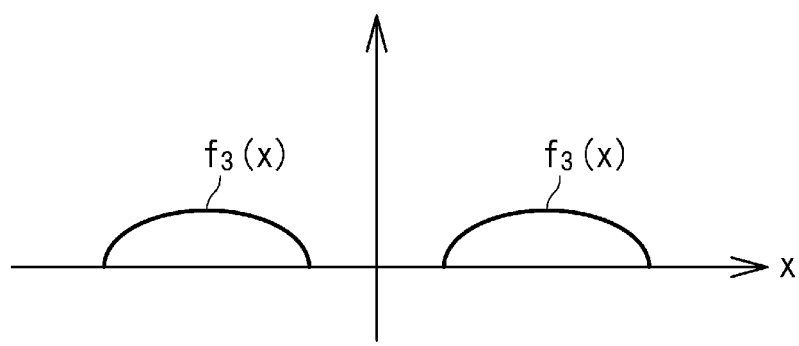
FIG. 13A illustrates the shapes of the gaps between the intake port and the intake valves.
Figure 13B:
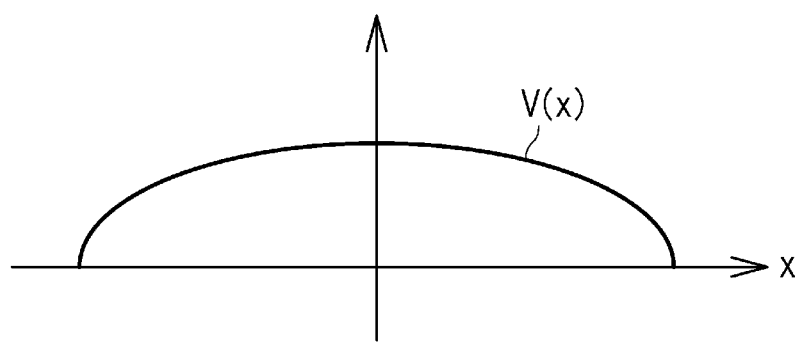
FIG. 13B illustrates an ideal flow velocity distribution of the intake air in the combustion chamber.
Figure 13C:
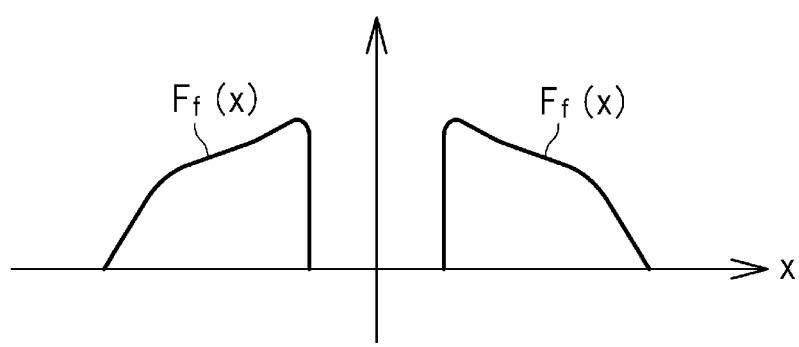
FIG. 13C illustrates an ideal flow velocity distribution of the intake air flowing from the intake port into the combustion chamber.

Then, an ideal flow velocity distribution $F_f(x)$ of the intake air flowing from the intake port 21 into the combustion chamber 20 will be described. FIG. 13A illustrates the shapes of the gaps between the intake port 21 and the intake valves 61 and 62. FIG. 13B illustrates an ideal flow velocity distribution of the intake air in the combustion chamber 20. FIG. 13C illustrates an ideal flow velocity distribution of the intake air flowing from the intake port 21 to the combustion chamber 20.

The function $f_3(x)$ illustrated in FIG. 13A is the function $f_3(x)$ illustrated in FIG. 11C and specifies each of the pair of the gap shapes that are projected on the coordinate plane S1, based on x. The function V(x) illustrated in FIG. 13B corresponds to the flow velocity distribution V(x, θ) illustrated in FIG. 6B and specifies an ideal flow velocity distribution of the intake air in the combustion chamber 20, which is projected on the coordinate plane S1, based on x. The flow velocity distribution V(x) is a flow velocity distribution V(x, θ) at a certain crank angle θ. The function $F_f(x)$ illustrated in FIG. 13C corresponds to the flow velocity distribution Vp1(x) or Vp2(x) illustrated in FIG. 8 and specifies an ideal flow velocity distribution of the intake air at the open end 31a or 32a, based on x.

The ideal flow velocity distribution $F_f(x)$ at the open end 31a or 32a illustrated in FIG. 13C is a flow velocity distribution at the time the intake air passes through each of the pair of the gaps having the gap shape $f_3(x)$, and the this ideal flow velocity distribution $F_f(x)$ produces the ideal flow velocity distribution V(x) of the intake air in the combustion chamber 20. Thus, the ideal flow velocity distribution $F_f(x)$ at the open end 31a or 32a is calculated based on the following formula (6). Note that, in the formula (6), the symbols "α" and "β" represent predetermined coefficients obtained by experiment, simulation, or other method.

$$F_f(x)=\alpha\cdot f_3(x)\times\beta\cdot V(x) \tag{6}$$

Figure 14A:
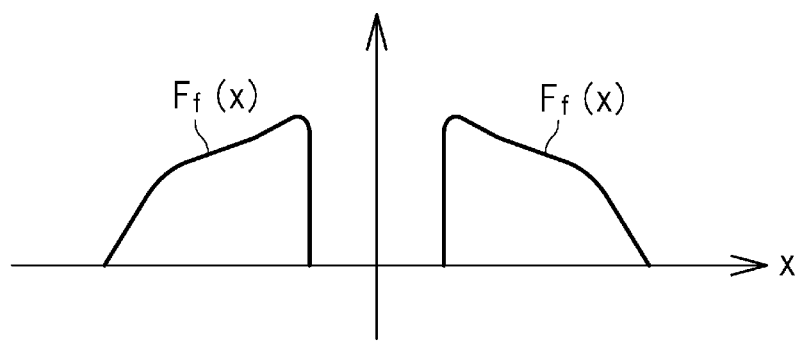
FIG. 14A illustrates an ideal flow velocity distribution of the intake air flowing from the intake port into the combustion chamber.
Figure 14B:
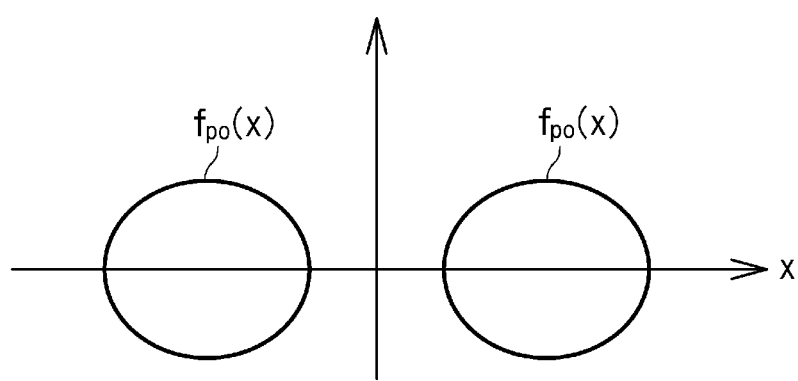
FIG. 14B illustrates shapes of open ends of the intake port.
Figure 14C:
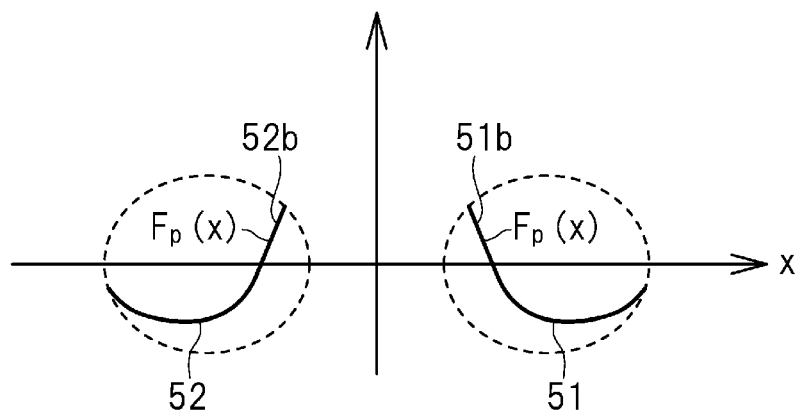
FIG. 14C illustrates cross sectional shapes of first and second plate sections of a partition wall plate.

Next, the cross sectional shape of the partition wall plate 50, which is contained in the intake port 21, or more precisely, the cross sectional shapes of the first and second plate sections 51 and 52, will be described. FIG. 14A illustrates an ideal flow velocity distribution of the intake air flowing from the intake port 21 into the combustion chamber 20. FIG. 14B illustrates the shapes of the open ends 31a and 32a of the intake port 21. FIG. 14C illustrates the cross sectional shapes of the first and second plate sections 51 and 52 of the partition wall plate 50.

The function $F_f(x)$ illustrated in FIG. 14A is the function $F_f(x)$ illustrated in FIG. 13C and specifies the ideal flow velocity distribution of the intake air at the open end 31a or 32a, based on x. The function $f_{po}(x)$ illustrated in FIG. 14B specifies the shape of the open end 31a or 32a that is projected on the coordinate plane S1, based on x. The function $F_p(x)$ illustrated in FIG. 14C specifies the cross sectional shape of the first and second plate sections 51 and 52 that is projected on the coordinate plane S1, based on x.

The cross sectional shape $F_p(x)$ of the first and second plate sections 51 and 52 illustrated in FIG. 14C determines the flow rate and the flow velocity of the intake air at the corresponding open end 31a or 32a and also determines the ideal flow velocity distribution $F_f(x)$ at the open end 31a or 32a. Thus, the cross sectional shape $F_p(x)$ of the first and second plate sections 51 and 52 is calculated based on the following formula (7). Note that, in the formula (7), the symbols "γ" and "δ" represent predetermined coefficients obtained by experiment, simulation, or other method.

$$F_P(x)=F_f(x)+\gamma\cdot f_{PO}(x)+\delta \tag{7}$$

As described above, the cross sectional shape $F_p(x)$ of the first and second plate sections 51 and 52 constituting the partition wall plate 50 is set based on the shape of the gap surrounded by the contour of the open end 31a or 32a and the contour of the corresponding head 61a or 62a, as viewed in the reference direction. Thus, the cross sectional shape $F_p(x)$ of the first plate section 51 or the second plate section 52 is set so that the flow velocity distribution of the intake air in the combustion chamber 20 will be similar to the ideal flow velocity distribution V(x). As a result, as illustrated in FIG. 14C, the first plate section 51 of the partition wall plate 50 is bent in such a manner that the width-direction inner part 51b protrudes to the first passage 41, and the second plate section 52 of the partition wall plate 50 is also bent in such a manner that the width-direction inner part 52b protrudes to the first passage 41. This structure enables a lot of intake air to flow at the width-direction inner part 80 of the first port section 31 and also enables a lot of intake air to flow at the width-direction inner part 82 of the second port section 32. Thus, the flow velocity of the intake air at the width-direction center part 20a of the combustion chamber 20 is increased, resulting in generation of a strong tumble flow.

The cross sectional shape $F_p(x)$ of the partition wall plate 50 is calculated by the following formula (8) that is derived by combining the formulas (6) and (7).

$$F_P(x)=\alpha\cdot f_3(x)\times\beta\cdot V(x)+r\cdot f_{PO}(x)+\delta \tag{8}$$

Herein, the cross sectional shape "$F_p(x)$" of the partition wall plate 50 is replaced with "$f_a(x)$", the gap shape "$f_3(x)$" surrounded by the contour of the head 61a or 62a and the contour of the corresponding open end 31a or 32a is replaced with "$f_b(x)$", the flow velocity distribution "V(x)" of the intake air flowing into the combustion chamber 20 is replaced with "$f_c(x)$", and the contour "$f_{po}(x)$" of the open end 31a or 32a is replaced with "$f_d(x)$". Thus, the cross sectional shape $f_a(x)$ of the partition wall plate 50 is calculated by the following formula (9).

In other words, the cross sectional shape of the partition wall plate 50 satisfies the following formula (9):

$$f_a(x)=\alpha \cdot f_b(x) \times \beta \cdot f_c(x) + \gamma \cdot f_d(x) + \delta \qquad (9)$$

where $f_a(x)$ represents the cross sectional shape of the partition wall plate 50 that is projected on the coordinate plane S1, $f_b(x)$ represents a shape of the gap which is surrounded by the contour of the head 61a or 62a and the contour of the corresponding open end 31a or 32a and is projected on the coordinate plane S1, $f_c(x)$ represents the flow velocity distribution of the intake air flowing into the combustion chamber 20, $f_d(x)$ represents the contour of the open end 31a or 32a that is projected on the coordinate plane S1, and $\alpha$, $\beta$, $\gamma$, and $\delta$ represent predetermined coefficients. Note that each shape is projected on the coordinate plane S1 along a line orthogonal to the coordinate plane S1.

Other Embodiments

Figure 15:
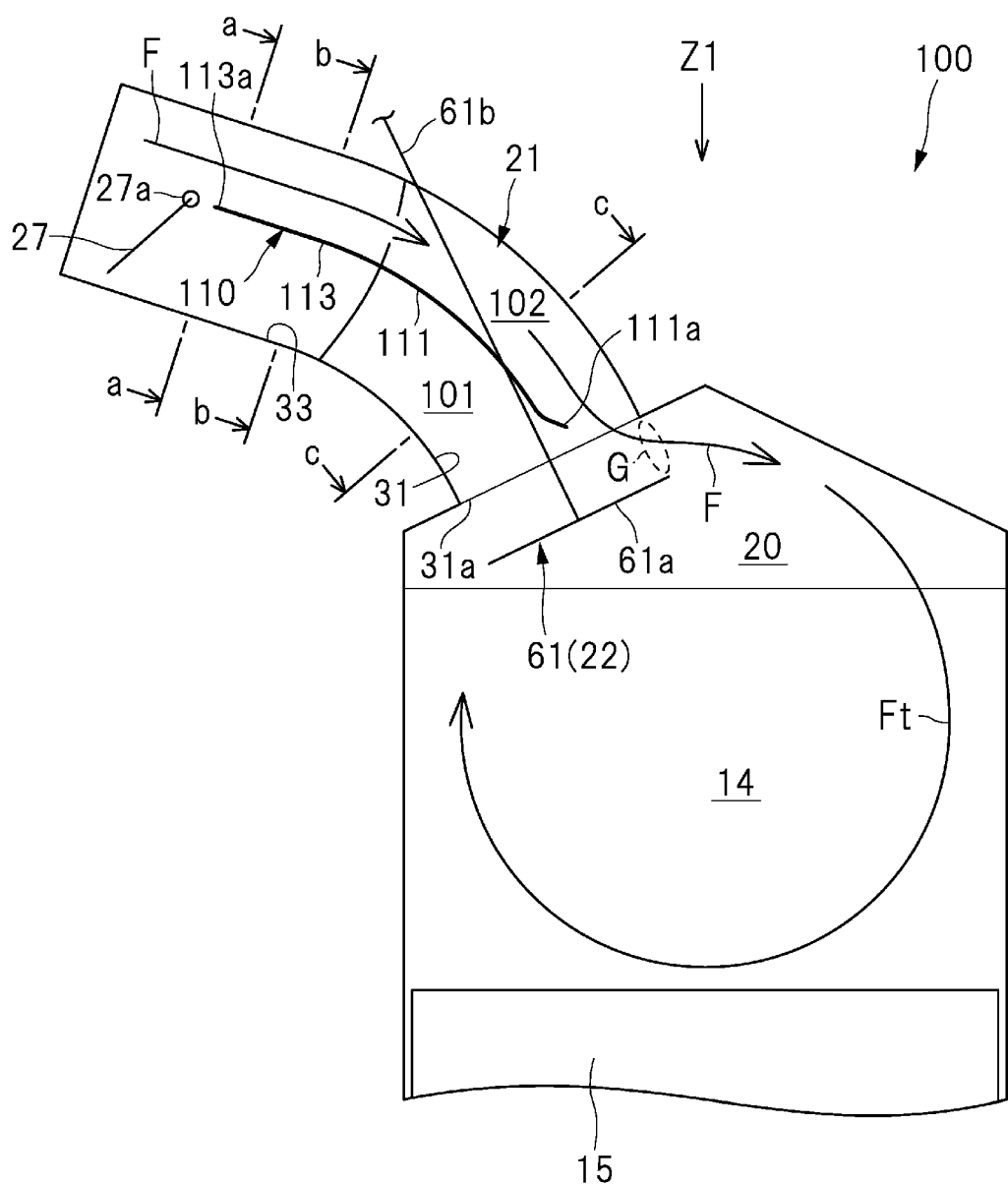
FIG. 15 simply illustrates an intake port and a combustion chamber that are provided to an engine according to another embodiment of the disclosure.
Figure 16:
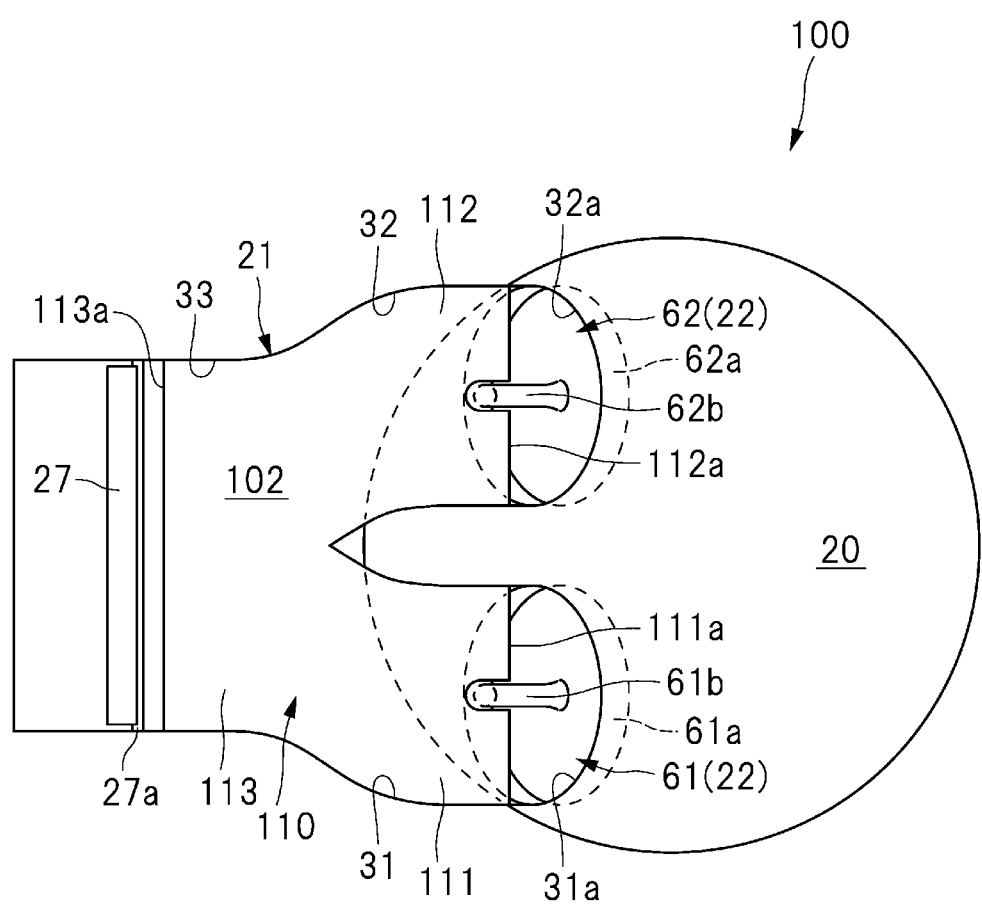
FIG. 16 simply illustrates an inside of the intake port from an arrow Z1 direction in FIG. 15.
Figure 17A:
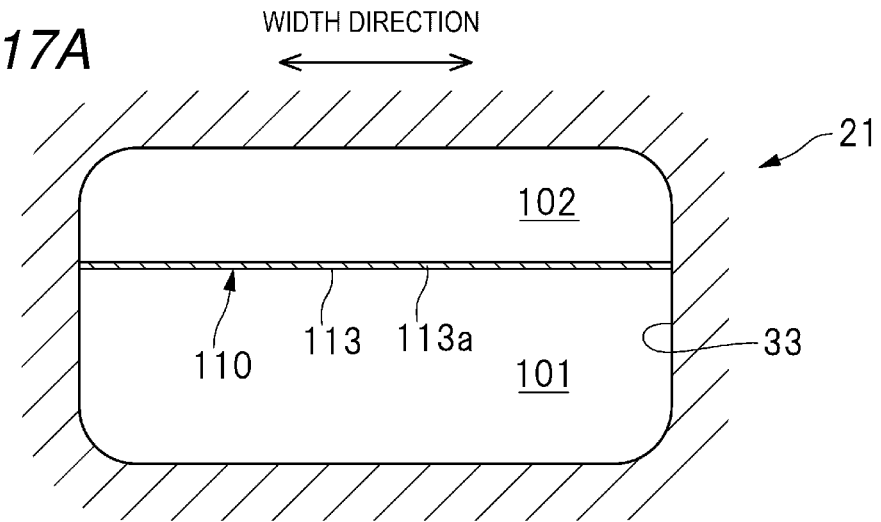
FIG. 17A is a sectional view along a line a-a in FIG. 15.
Figure 17B:
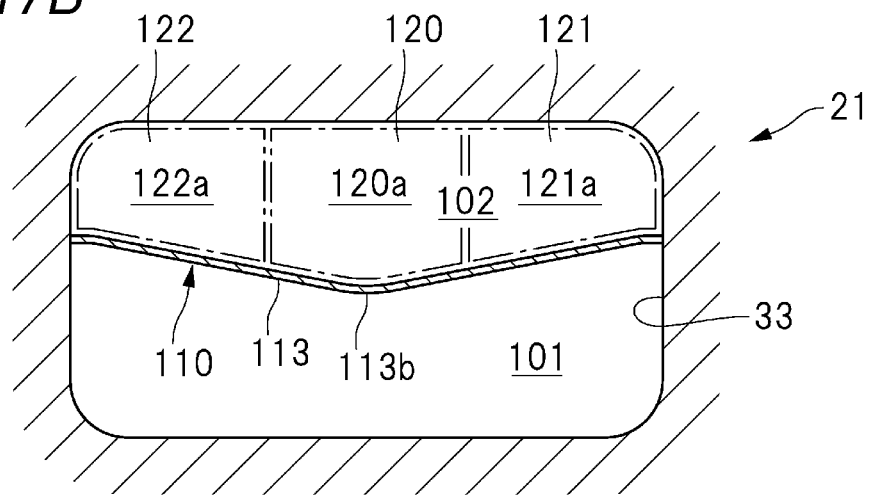
FIG. 17B is a sectional view along a line b-b in FIG. 15.
Figure 17C:
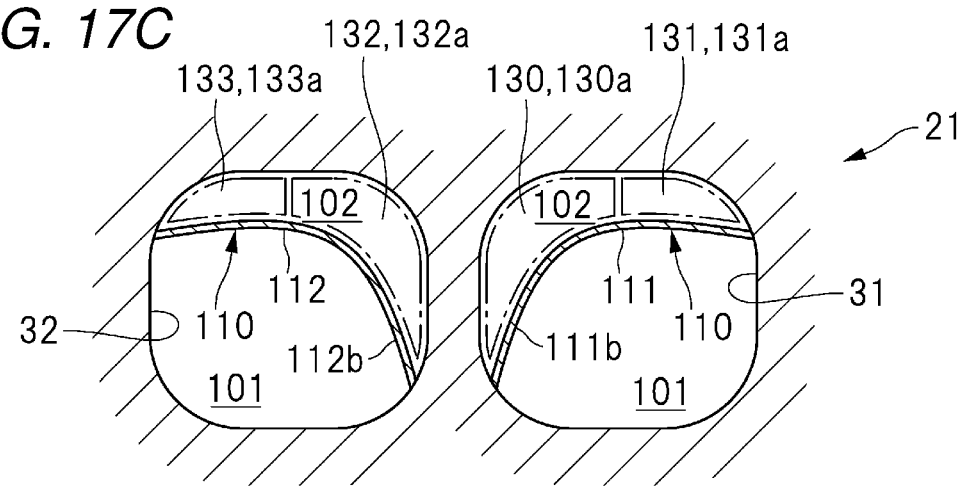
FIG. 17C is a sectional view along a line c-c in FIG. 15.

FIG. 2 illustrates an example in which the first passage 41 on the head cover 19 side is closed by the tumble valve 27, but the embodiment is not limited thereto, and the second passage 42 on the side of the cylinder block 11 or 12 may be closed by the tumble valve 27. FIG. 15 simply illustrates the intake port 21 and the combustion chamber 20 that are provided to an engine 100 according to another embodiment of the disclosure. FIG. 16 simply illustrates the inside of the intake port 21 from the arrow Z1 direction in FIG. 15. FIG. 17A is a sectional view along a line a-a in FIG. 15. FIG. 17B is a sectional view along a line b-b in FIG. 15. FIG. 17C is a sectional view along a line c-c in FIG. 15. Note that the same sections and parts as those illustrated in FIGS. 2 and 7 are denoted by the same reference symbols in FIGS. 15 and 17, and descriptions thereof are omitted.

As illustrated in FIG. 15, the intake port 21, which branches off to the combustion chamber 20, is provided with a partition wall plate 110 that partitions the inside of the intake port 21 into a first passage 101 on the side of the cylinder block 11 or 12 and a second passage 102 on the head cover 19 side. The partition wall plate 110 has a common plate section 113 that is contained in the common port section 33, a first plate section 111 that is contained in the first port section 31, and a second plate section 112 that is contained in the second port section 32. In addition, an end 111a of the first plate section 111, which is contained in the first port section 31, is positioned closer to the open end 31a than the stem 61b of the first intake valve 61, and an end 112a of the second plate section 112, which is contained in the second port section 32, is positioned closer to the open end 32a than the stem 62b of the second intake valve 62.

As illustrated in FIG. 15, moving the tumble valve 27 to the close position causes most of the intake air to pass through the second passage 102 of the intake port 21, as illustrated by the arrow F, whereby the intake air flows into the combustion chamber 20 while being increased in flow velocity. Moreover, the intake air flows along the partition wall plate 110 and thereby advances to the gap G between the intake port 21 and the intake valve 61 or 62. Thus, the intake air smoothly flows along an inner wall of the combustion chamber 20, as illustrated by the arrow Ft, resulting in generation of a strong tumble flow in the combustion chamber 20 and in the cylinder bore 14.

As illustrated in FIG. 17A, an upstream end 113a of the partition wall plate 110 in the vicinity of the tumble valve 27 is formed flat along the turn axis 27a of the tumble valve 27. In addition, as illustrated in FIG. 17B, the common plate section 113 of the partition wall plate 110 is bent in such a manner that a width-direction center part 113b protrudes to the first passage 101. That is, in the second passage 102 of the common port section 33, which is defined by the common plate section 113, a passage cross sectional area 120a of a width-direction center part 120 is set larger than each of a passage cross sectional area 121a of a width-direction outer part 121 and a passage cross sectional area 122a of a width-direction outer part 122. The width-direction center part 120 and the width-direction outer parts 121 and 122 illustrated in the drawing are obtained by trisecting the second passage 102 of the common port section 33 in the width direction.

As illustrated in FIG. 17C, the first plate section 111 of the partition wall plate 110 is bent in such a manner that a width-direction inner part protrudes to the first passage 101. That is, in the second passage 102 of the first port section 31, which is defined by the first plate section 111, a passage cross sectional area 130a of a width-direction inner part 130 is set larger than a passage cross sectional area 131a of a width-direction outer part 131. The second plate section 112 of the partition wall plate 110 is bent in such a manner that a width-direction inner part protrudes to the first passage 101. That is, in the second passage 102 of the second port section 32, which is defined by the second plate section 112, a passage cross sectional area 132a of a width-direction inner part 132 is set larger than a passage cross sectional area 133a of a width-direction outer part 133. The width-direction inner part 130 and the width-direction outer part 131 illustrated in the drawing are obtained by bisecting the second passage 102 of the first port section 31 in the width direction. The width-direction inner part 132 and the width-direction outer part 133 illustrated in the drawing are obtained by bisecting the second passage 102 of the second port section 32 in the width direction.

The cross sectional shape of the partition wall plate 110 for partitioning the intake port 21 is set in this manner. Thus, in the case in which the tumble valve 27 is closed to guide the intake air to the second passage 102, the flow rate of the intake air flowing to the width-direction center part 20a of the combustion chamber 20 is increased, and the flow velocity of the intake air is increased at the width-direction center part 20a of the combustion chamber 20. In short, most of the intake air that flows into the intake port 21 via the valve unit 25, flows to the width-direction center part 120 of the common port section 33. At this time, a lot of intake air flows at the width-direction inner part 130 of the first port section 31, and a lot of intake air flows at the width-direction inner part 132 of the second port section 32, resulting in generation of a strong tumble flow in the combustion chamber 20.

Figure 18A:
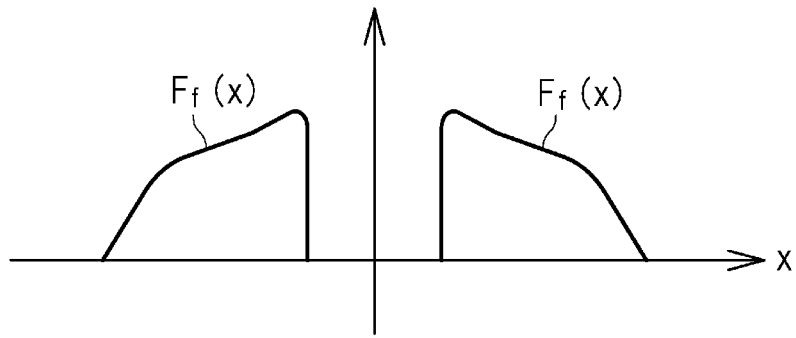
FIG. 18A illustrates an ideal flow velocity distribution of the intake air flowing from the intake port into the combustion chamber.
Figure 18B:
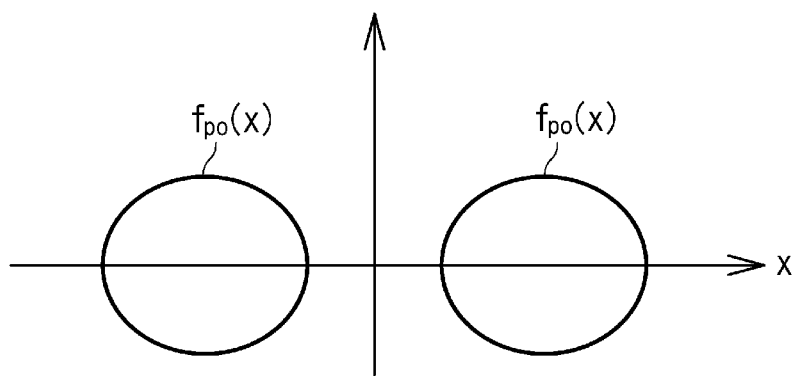
FIG. 18B illustrates shapes of open ends of the intake port.
Figure 18C:
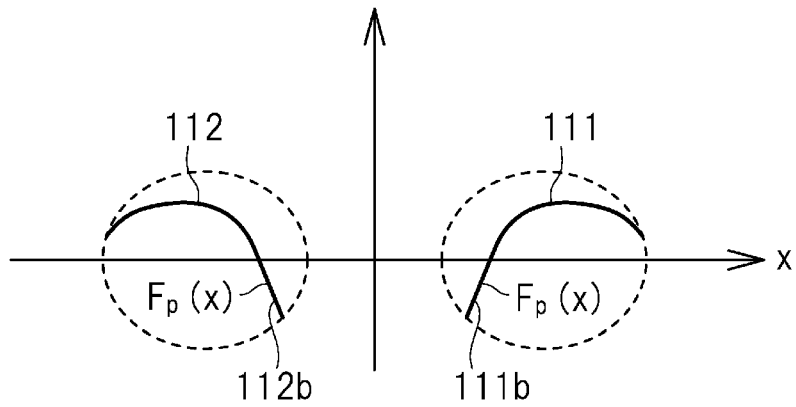
FIG. 18C illustrates cross sectional shapes of first and second plate sections of a partition wall plate.

FIG. 18A illustrates an ideal flow velocity distribution $F_f(x)$ of the intake air flowing from the intake port 21 into the combustion chamber 20. FIG. 18B illustrates the shapes $f_{po}(x)$ of the open ends 31a and 32a of the intake port 21. FIG. 18C illustrates the cross sectional shapes $F_p(x)$ of the first and second plate sections 111 and 112 of the partition wall plate 110. As illustrated in FIG. 15, also in the case in which the first passage 101 is closed by the tumble valve 27 to allow most of the intake air to flow in the second passage 102, the cross sectional shape of the partition wall plate 110 can be set by using the formula (7). That is, as illustrated in FIGS. 18A to 18C, the cross sectional shape $F_p(x)$ of the first and second plate sections 111 and 112 can be set based on the formula (7) by using the ideal flow velocity distribution $F_i(x)$ at the corresponding open end 31a or 32a and the shape $f_{po}(x)$ of the corresponding open end 31a or 32a of the intake port 21.

It is needless to say that the disclosure is not limited to the foregoing embodiments and various modifications can be made thereto within the scope that does not depart from the gist thereof. In one example, although the cross sectional shape of the intake port 21 illustrated in FIGS. 7 and 17 is a rounded quadrangular shape, the cross sectional shape is not limited thereto and can be any shape such as a circle or an ellipse. In another example, although the contour $f_2(x)$ of the head 61a or 62a illustrated in FIG. 9 represents a contour of the intake valve 61 or 62 opened by the maximum lift amount, the contour is not limited thereto and can be a contour of the intake valve 61 or 62 opened by another lift amount.

The invention claimed is:

1. An engine comprising:
   a combustion chamber;
   a cylinder head comprising an intake port that communicates with the combustion chamber;
   an intake valve comprising a head that is configured to open and close an open end of the intake port, wherein, in an open state, a gap exists between the intake valve and the intake port;
   a partition wall plate partitioning the intake port into a first passage and a second passage; and
   a tumble valve configured to open and close either one of the first passage and the second passage,
   wherein the gap is surrounded by a contour of the head and a contour of the open end, as viewed in a reference direction, the reference direction being a direction from a reference point in the intake port to a gap between the open end and the head, and
   wherein a cross sectional shape of the partition wall plate is set on a basis of a size of the gap surrounded by the contour of the head and the contour of the open end.

2. The engine according to claim 1, wherein
   the cross sectional shape of the partition wall plate satisfies the following formula:

$$f_a(x)=\alpha \cdot f_b(x) \times \beta \cdot f_c(x) + \gamma \cdot f_d(x) + \delta$$

where
   an x-axis represents a coordinate axis that is contained in a coordinate plane orthogonal to a straight line from the reference point in the intake port to the gap between the open end and the head and that is orthogonal to a direction from an intake side to an exhaust side of the combustion chamber,
   $f_a(x)$ represents a cross sectional shape of the partition wall plate that is projected on the coordinate plane,
   $f_b(x)$ represents the shape of the gap that is surrounded by the contour of the head and the contour of the open end and that is projected on the coordinate plane,
   $f_c(x)$ represents a flow velocity distribution of intake air flowing into the combustion chamber,
   $f_d(x)$ represents the contour of the open end that is projected on the coordinate plane, and
   $\alpha$, $\beta$, $\gamma$, and $\delta$ represent predetermined coefficients.

3. The engine according to claim 1, wherein an upstream end of the partition wall plate in a vicinity of the tumble valve is formed flat along a turn axis of the tumble valve.

4. The engine according to claim 1, wherein a common plate section of the partition wall plate downstream of an upstream end of the partition wall plate is bent in such a manner that a width-direction center part protrudes to the first passage.

5. The engine according to claim 4, wherein a passage cross sectional area of a width-direction center part of the common plate section is set larger than each of a first passage cross sectional area of a width-direction outer part and a second passage cross sectional area of an other width-direction outer part.

6. The engine according to claim 5, wherein the width-direction center part and the first and second width-direction outer parts are obtained by trisecting the second passage in a width direction.

7. The engine according to claim 1, wherein a portion of the partition wall plate is bent based on the cross sectional shape of the partition wall plate.

8. The engine according to claim 1, wherein the tumble valve comprises a turn axis, and
   wherein the turn axis is positioned at an upstream end of the partition wall plate.

9. The engine according to claim 8, wherein the upstream end of the partition wall plate in the vicinity of the turn axis is formed flat along the turn axis.

10. The engine according to claim 1, wherein the tumble valve is configured to independently open and close both of the first passage and the second passage.

11. The engine according to claim 1, wherein the tumble valve is configured to independently close, at a different position, each of the first passage and the second passage.

12. An engine comprising:
    a combustion chamber;
    a cylinder head comprising an intake port that comprises a common port section branching off into a first port section and a second port section;
    a first intake valve configured to open and close a first open end of the first port section that communicates with the combustion chamber;
    a second intake valve configured to open and close a second open end of the second port section that communicates with the combustion chamber;
    a partition wall plate partitioning the intake port into a first passage and a second passage; and
    a tumble valve configured to open and close the first passage, wherein
    the partition wall plate comprises
      a common plate section positioned at the common port section,
      a first plate section positioned at the first port section that is bent in such a manner that a width-direction inner part protrudes to the first passage, and
      a second plate section positioned at the second port section,
    the second passage at the common port section, which is defined by the common plate section, comprises a first width-direction outer part, and a first width-direction center part having a passage cross sectional area larger than a passage cross sectional area of the first width-direction outer part,
    the second passage at the first port section, which is defined by the first plate section, comprises a second width-direction outer part, and a second width-direction inner part having a passage cross sectional area larger than a passage cross sectional area of the second width-direction outer part, and the second passage at the second port section, which is defined by the second plate section, comprises a third width-direction outer part, and a third width-direction inner part having a passage cross sectional area larger than a passage cross sectional area of the third width-direction outer part.

13. The engine according to claim 12, wherein
the first plate section comprises an end that is positioned closer to the first open end than a stem of the first intake valve, and
the second plate section has an end that is positioned closer to the second open end than a stem of the second intake valve.

14. An engine comprising:
a combustion chamber;
a cylinder head comprising an intake port that communicates with the combustion chamber;
an intake valve comprising a head that is configured to open and close an open end of the intake port;
a partition wall plate partitioning the intake port into a first passage and a second passage; and
a tumble valve configured to open and close either one of the first passage and the second passage,
wherein a cross sectional shape of the partition wall plate satisfies the following formula:

$$f_a(x) = \alpha \cdot f_b(x) \times \beta \cdot f_c(x) + \gamma \cdot f_d(x) + \delta$$

where
an x-axis represents a coordinate axis that is contained in a coordinate plane orthogonal to a straight line from the reference point in the intake port to a gap between the open end and the head and that is orthogonal to a direction from an intake side to an exhaust side of the combustion chamber,
$f_a(x)$ represents a cross sectional shape of the partition wall plate that is projected on the coordinate plane,
$f_b(x)$ represents the shape of the gap that is surrounded by a contour of the head and a contour of the open end and that is projected on the coordinate plane,
$f_c(x)$ represents a flow velocity distribution of intake air flowing into the combustion chamber,
$f_d(x)$ represents the contour of the open end that is projected on the coordinate plane, and
$\alpha$, $\beta$, $\gamma$, and $\delta$ represent predetermined coefficients.

\* \* \* \* \*